United States Patent
Wang et al.

(10) Patent No.: US 12,423,376 B2
(45) Date of Patent: Sep. 23, 2025

(54) CONVOLUTION OPERATION METHOD, CONVOLUTION OPERATION APPARATUS, ELECTRONIC DEVICE AND STORAGE MEDIUM

(71) Applicant: Beijing Youzhuju Network Technology Co., Ltd., Beijing (CN)

(72) Inventors: Shuai Wang, Beijing (CN); Tao Li, Beijing (CN); Hangjian Yuan, Beijing (CN); Yunfeng Shi, Beijing (CN); Jian Wang, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/963,209

(22) Filed: Nov. 27, 2024

(65) Prior Publication Data
US 2025/0086249 A1  Mar. 13, 2025

Related U.S. Application Data

(63) Continuation of application No. PCT/CN2023/096983, filed on May 30, 2023.

(30) Foreign Application Priority Data

May 31, 2022 (CN) ............ 202210610935.6

(51) Int. Cl.
*G06F 17/15* (2006.01)
(52) U.S. Cl.
CPC .................. *G06F 17/15* (2013.01)
(58) Field of Classification Search
CPC .............. G06F 17/15–153; G06N 3/04; G06N 3/0464; G06N 3/063
See application file for complete search history.

(56) References Cited

U.S. PATENT DOCUMENTS

2018/0285715 A1* 10/2018 Son ............... G06N 3/045
2021/0019593 A1  1/2021 Lin et al.
2024/0119114 A1* 4/2024 Lee ............... G06N 3/063

FOREIGN PATENT DOCUMENTS

CN   108073977 A   5/2018
CN   108960411 A   12/2018
(Continued)

OTHER PUBLICATIONS

Cheng et al., "A Convolutional Neural Network Adjustment And Related Device" is a Machine translation of CN 108960411 A. (Year : 2018).*

(Continued)

*Primary Examiner* — Carlo Waje
(74) *Attorney, Agent, or Firm* — BakerHostetler

(57) ABSTRACT

A convolution operation method, a convolution operation apparatus, an electronic device and a storage medium. The method includes: determining an operation convolution kernel, wherein the operation convolution kernel is obtained on the basis of an initial convolution kernel; adjusting an arrangement mode of input data on the basis of the number of channels of the operation convolution kernel, so as to obtain target data, wherein the size of the target data and the number of channels of the target data are different from the size of the input data and the number of channels of the input data, and the number of channels of the target data is equal to the number of channels of the operation convolution kernel; and performing a convolution operation on the basis of the target data and the operation convolution kernel, so as to obtain a convolution operation result.

20 Claims, 10 Drawing Sheets

(56) References Cited

FOREIGN PATENT DOCUMENTS

| | | | |
|---|---|---|---|
| CN | 110414672 A | 11/2019 | |
| CN | 110738317 A | 1/2020 | |
| CN | 111427838 A | 7/2020 | |
| CN | 112598110 A | 4/2021 | |
| CN | 113627587 A | 11/2021 | |
| CN | 113688069 A | 11/2021 | |
| WO | WO 2020/143235 A1 | 7/2020 | |

OTHER PUBLICATIONS

International Patent Application No. PCT/CN2023/096983; Int'l Written Opinion and Search Report; dated Sep. 6, 2023; 8 pages.
China Patent Application No. 202210610935.6; Office Action; dated May 1, 2025; 14 pages.
Xu Xin et al.; "A highly parallel design method for convolutional neural networks accelerator"; Journal of Harbin Institute of Technology; vol. 52 No. 4; Apr. 2020; p. 31-37 (Contains English Abstract).

* cited by examiner

CONVOLUTION OPERATION METHOD, CONVOLUTION OPERATION APPARATUS, ELECTRONIC DEVICE AND STORAGE MEDIUM

The present application is a continuation of International Patent Application No. PCT/CN2023/096983, filed on May 30, 2023, which claims the priority of Chinese Patent Application No. 202210610935.6 filed on May 31, 2022, the disclosure of which is incorporated by reference herein in its entirety as part of the present application.

TECHNICAL FIELD

Embodiments of the present disclosure relate to a convolution operation method, a convolution operation apparatus, an electronic device, and a storage medium.

BACKGROUND

With the development of technology, the artificial intelligence (AI) technology has been widely used in a plurality of fields. Deep learning is one of important techniques of the AI technology. The deep learning technique based on an artificial neural network has achieved a great progress in the fields such as object classification, text processing, image search, and man-machine conversation. Convolutional neural network (CNN) is a widely applied deep learning technique, which has great advantages in image processing and the like, because image data can be directly input thereto without complex processing.

SUMMARY

At least one embodiment of the present disclosure provides a convolution operation method, comprising: determining an operation convolution kernel, wherein the operation convolution kernel is obtained based on an initial convolution kernel; the initial convolution kernel is expressed as [R, S, C, K]; the operation convolution kernel is expressed as [1, 1, (C×R×S), K]; and R, S, C, and K are all integers greater than 0; adjusting a layout of input data based on a number of channels of the operation convolution kernel to obtain target data, wherein a size and a number of channels of the target data are different from a size and a number of channels of the input data, and the number of channels of the target data is equal to the number of channels of the operation convolution kernel; and performing a convolution operation based on the target data and the operation convolution kernel to obtain a convolution operation result, wherein the convolution operation result of the target data and the operation convolution kernel is equal to a convolution operation result of the input data and the initial convolution kernel.

At least one embodiment of the present disclosure provides a convolution operation apparatus, comprising: a determination unit configured to determine an operation convolution kernel, wherein the operation convolution kernel is obtained based on an initial convolution kernel; the initial convolution kernel is expressed as [R, S, C, K]; the operation convolution kernel is expressed as [1, 1, (C×R×S), K]; and R, S, C, and K are all integers greater than 0; an adjustment unit configured to adjust a layout of input data based on a number of channels of the operation convolution kernel to obtain target data, wherein a size and a number of channels of the target data are different from a size and a number of channels of the input data, and the number of channels of the target data is equal to the number of channels of the operation convolution kernel; and a calculation unit configured to perform a convolution operation based on the target data and the operation convolution kernel to obtain a convolution operation result, wherein the convolution operation result of the target data and the operation convolution kernel is equal to a convolution operation result of the input data and the initial convolution kernel.

At least one embodiment of the present disclosure provides an electronic device, comprising a convolution operation apparatus provided by any embodiment of the present disclosure.

At least one embodiment of the present disclosure provides an electronic device, comprising: a processor; and a memory, the memory comprising at least one computer program module, wherein the at least one computer program module is stored in the memory and configured to be executed by the processor, and the at least one computer program module is configured to implement the convolution operation method as provided by any embodiment of the present disclosure.

At least one embodiment of the present disclosure provides a storage medium, storing non-transitory computer-readable instructions which, when executed by a computer, cause the computer implement the convolution operation method as provided by any embodiment of the present disclosure.

BRIEF DESCRIPTION OF DRAWINGS

In order to illustrate the technical solutions of the embodiments of the present disclosure more clearly, a brief introduction to the accompanying drawings of the embodiments will be given below. Obviously, the accompanying drawings described below relate only to some embodiments of the present disclosure, and are not intended to limit the present disclosure.

DETAILED DESCRIPTION

Figure 1:
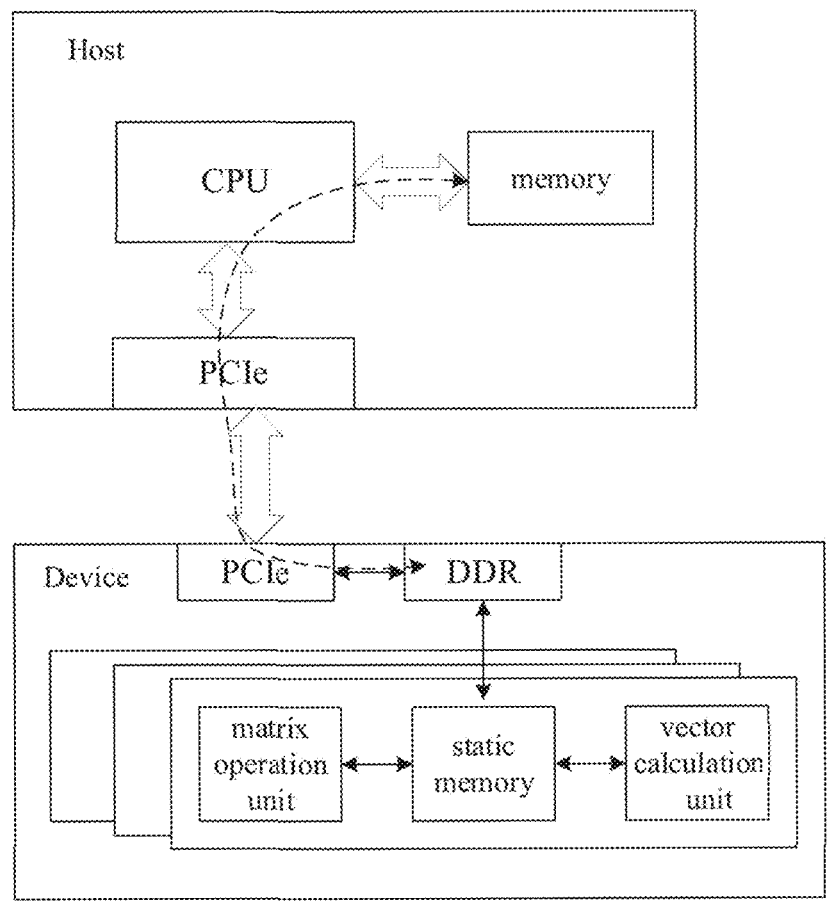
FIG. 1 is a schematic diagram of a data flow of a convolution operation provided by some embodiments of the present disclosure.

The embodiments of the present disclosure will be described in more detail with reference to the accompanying drawings hereinafter. Although certain embodiments of the present disclosure are shown in the drawings, it should be understood that the present disclosure may be embodied in various forms and should not be interpreted as being limited to the embodiments set forth herein; rather, these embodiments are provided so as to thoroughly and completely convey the concept of the present disclosure. It should be appreciated that the accompanying drawings and embodiments of the present disclosure are provided for illustrative purposes only and are not intended to limit the scope of protection of the present disclosure.

It should be understood that the various steps described in the method embodiments of the present disclosure may be performed in a different order, and/or concurrently. Furthermore, the method embodiments may include additional steps and/or some illustrated steps may be omitted. The scope of the present disclosure is not limited in this respect.

The term "comprising" as used herein and its variants are to be interpreted as open-ended inclusion, that is, "including but not limited to." The term "based on" indicates "at least partially based on." The phrase "an embodiment" denotes "at least one embodiment"; the phrase "another embodiment" denotes "at least one other embodiment"; and the phrase "some embodiments" denotes "at least some embodiments." Definitions of other terms will be provided in the subsequent descriptions.

It should be noted that the use of terms such as "first," "second," etc., in the present disclosure is solely for the purpose of distinguishing between different devices, modules, or units, and is not intended to define the sequence or interdependency of the functions executed by these devices, modules, or units.

It is also worth noting that the modifiers "one" and "multiple" used in the present disclosure are illustrative rather than restrictive. Those skilled in the art should understand that, unless explicitly stated otherwise in context, these should be construed as meaning "one or more."

Names of messages or information exchanged between a plurality of apparatuses in embodiments of the present disclosure are only used for the purpose of description and not meant to limit the scope of these messages or information.

Input data to a convolutional neural network is generally a 3-channel picture. For example, an input image to the first-layer convolution of a residual network ResNet50 is [1, 224, 224, 3]. That is, the input image has 3 channels, and an image size of each channel is 224×224. A shape of a convolution kernel shape used by the first-layer convolution of the residual network ResNet50 is [7, 7, 3, 64]. A commonly used neural network accelerator is generally provided with a matrix operation unit which is mainly responsible for acceleration of a matrix operation and a convolution operation in a neural network. To accelerate the matrix operation, the matrix operation unit may generally improve a degree of computation parallelism by increasing a computation scale. For example, an operation scale may be 64×64, 128×128, or the like. However, due to a small number of channels (e.g., 3 channels) of the input data to the first-layer convolution of the convolutional neural network, a computing power utilization ratio of a matrix operation unit on a hardware accelerator is low, and a computation time of the first-layer convolution may be relatively long and an acceleration effect is not obvious. In addition to this, if strictly following a channel align tensor layout, a memory space of data will be increased significantly and a transmission time of data will be increased.

As shown in FIG. 1, the hardware accelerator is usually mounted on a peripheral component interconnect express (PCIe) node of a host as a slave device to the host. PCIe is a high-speed serial computer expansion bus standard that can realize high-speed data transmission. Relative to the host, the hardware accelerator is used as a device. When the convolution operation is performed, the data input to the first-layer convolution needs to be sent to the hardware accelerator from the host via PCIe, and this process is called Host2Device. For example, a central processing unit (CPU) reads from a memory data which is then transmitted to the device hardware accelerator through PCIe and stored in a memory (e.g., a DDR) on the hardware accelerator. The hardware accelerator may then utilize these data to perform the convolution operation.

Taking the first-layer convolution of the residual network ResNet50 as an example, the first-layer convolution needs to achieve the operation of the input data and the convolution kernel, expressed as: [1, 224, 224, 3]×[7, 7, 3, 64]=[1, 112, 112, 64]. Here, the input data is expressed as [1, 224, 224, 3], i.e., 3-channel data and having a size of 224×224. The convolution kernel is expressed as [7, 7, 3, 64], i.e., 64 sets each having 3 convolution kernels and the convolution kernel having a size of 7×7. The result obtained is 64-channel data having a size of 112×112.

Assuming the matrix operation unit on the hardware accelerator is of 64×64, due to the limitation of the channel align tensor layout, the input data to the first-layer convolution needs to be extended from [1, 224, 224, 3] to [1, 224, 224, 64] on the host, and all redundant channel data is padded with 0. As for the memory space, it needs to be increased by 21.33 times. Likewise, the transmission time for the data to be transmitted from the host to the hardware accelerator may also be increased by 21.33 times. In this case, the computing power utilization ratio of the matrix operation unit is only 4.68%. As for the time for a convolution operation, it may take 614656 cycles for the matrix operation unit to complete the operation of the first-layer convolution.

Due to the number of channels for the first-layer convolution of the convolutional neural network to compute the input data is small and the scale of the matrix operation unit of the hardware accelerator is large, the result is that a computation requirement does not match hardware characteristics, causing the following problems in the computation of the first-layer convolution of the convolutional neural network. First, the layout of the input data needs to be re-adjusted using the CPU of the host, and the memory space occupied is increased and a CPU time is consumed. Second, the volume of the re-arranged input data increases, and PCIe transmission time of Host2Device increases. Third, the utilization ratio of the matrix operation unit of the hardware accelerator is low, failing to utilize its full computing power, resulting in a waste of hardware resources. Fourth, the time for the matrix operation unit of the hardware accelerator to perform the computation of the first-layer convolution is long, and the purpose of hardware acceleration cannot be achieved.

At least one embodiment of the present disclosure provides a convolution operation method, a convolution operation apparatus, an electronic device, and a storage medium. The convolution operation method can increase the utilization ratio of the matrix operation unit, effectively utilize the computing power of the matrix operation unit, shorten the time of the convolution operation, improve the operation efficiency, and save the data transmission time.

Embodiments of the present disclosure will be described below in detail with reference to the accompanying drawings. It should be noted that like reference numerals in different drawings will be used to designate like elements described.

At least one embodiment of the present disclosure provides a convolution operation method. The convolution operation method includes: determining an operation convolution kernel, wherein the operation convolution kernel is obtained based on an initial convolution kernel; the initial convolution kernel is expressed as [R, S, C, K]; the operation convolution kernel is expressed as [1, 1, (C×R×S), K]; and R, S, C, and K are all integers greater than 0; adjusting a layout of input data based on a number of channels of the operation convolution kernel to obtain target data, wherein a size and a number of channels of the target data are different from a size and a number of channels of the input data, and the number of channels of the target data is equal to the number of channels of the operation convolution kernel; and performing a convolution operation based on the target data and the operation convolution kernel to obtain a convolution operation result. The convolution operation result of the target data and the operation convolution kernel is equal to a convolution operation result of the input data and the initial convolution kernel.

Figure 2:
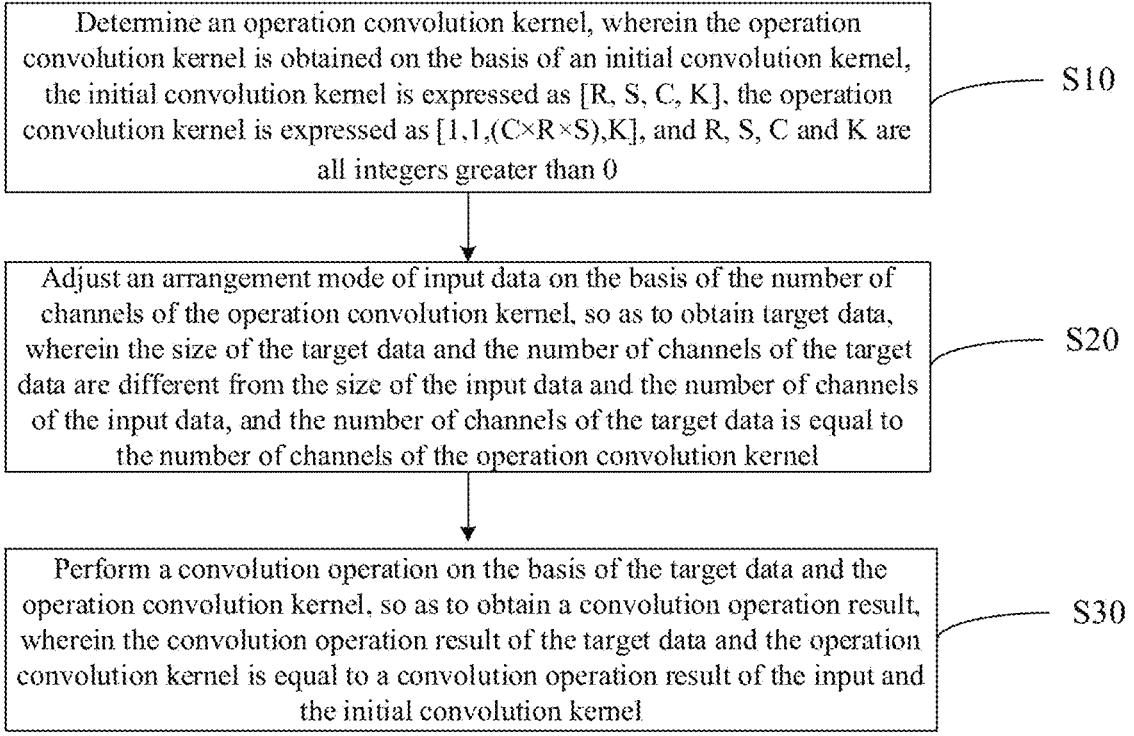
FIG. 2 is a flowchart of a convolution operation method provided by some embodiments of the present disclosure.

FIG. 2 is a flowchart of a convolution operation method provided by some embodiments of the present disclosure. As shown in FIG. 2, in some embodiments, the convolution operation method includes steps S10 to S30.

Step S10: determining an operation convolution kernel, wherein the operation convolution kernel is obtained based on an initial convolution kernel, the initial convolution kernel is expressed as [R, S, C, K], the operation convolution kernel is expressed as [1, 1, (C×R×S), K], and R, S, C, and K are all integers greater than 0;

Step S20: adjusting a layout of input data based on a number of channels of the operation convolution kernel to obtain target data, wherein a size and a number of channels of the target data are different from a size and a number of channels of the input data, and the number of channels of the target data is equal to the number of channels of the operation convolution kernel; and Step S30: performing a convolution operation based on the target data and the operation convolution kernel to obtain a convolution operation result, wherein the convolution operation result of the target data and the operation convolution kernel is equal to a convolution operation result of the input data and the initial convolution kernel.

For example, the convolution operation method may be applied to a first-layer convolution operation of a convolutional neural network. As a matter of course, the embodiments of the present disclosure are not limited thereto. The convolution operation method may be applied not only to the convolutional neural network, but also to convolution operations of other types of networks, and may be applied not only to the first-layer convolution operation (layer 1 convolution operation), but also to other layers of convolution operations. These may be determined according to an actual requirement and will not be limited by the embodiments of the present disclosure.

For example, in step S10, the initial convolution kernel is a convolution kernel needed when the first-layer convolution operation is performed. The initial convolution kernel is expressed as [R, S, C, K]. Taking the first-layer convolution of the residual network ResNet50 as an example, an operation needing to be realized by the first-layer convolution is expressed as: [1, 224, 224, 3]×[7, 7, 3, 64]=[1, 112, 112, 64], and the initial convolution kernel [R, S, C, K] is [7, 7, 3, 64]. That is, in this example, R=7, S=7, C=3, and K=64. A parameter of the initial convolution kernel is transformed to obtain the operation convolution kernel [1, 1, (C×R×S), K]. In the above example, the operation convolution kernel may be obtained according to the initial convolution kernel. The operation convolution kernel is [1, 1, 147, 64]. A transformation principle of the convolution kernel is briefly described below with reference to FIG. 3.

Figure 3:
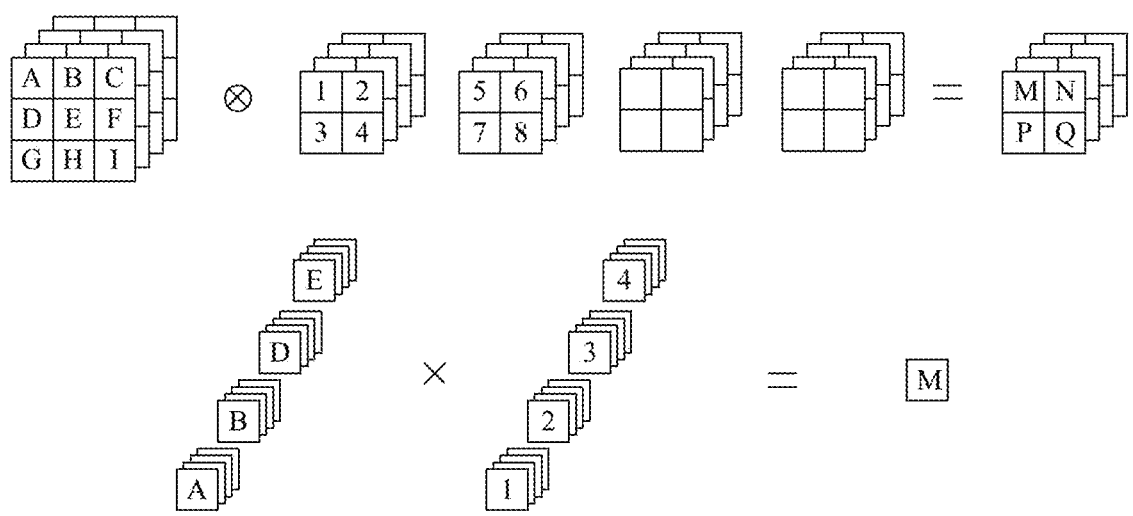
FIG. 3 is a schematic diagram of a convolution operation.

FIG. 3 is a schematic diagram of a convolution operation. As shown in FIG. 3, if the size of the input data [1, 3, 3, 5] and the size of the convolution kernel [2, 2, 5, 4], the size of the output data is [1, 2, 2, 4]. For example, for point M, a computation manner thereof is as shown in FIG. 3. Since the size of the convolution kernel is 2×2 and the number of channels is 5, the point M is a result of multiplying 20 points of the input data by corresponding points of the convolution kernel and then accumulating products. By utilizing the characteristics of the convolution computation, the convolution kernel may be transformed from R×S×C×K to 1×1×(C×R×S)×K, and the input data is adjusted accordingly. Therefore, the computation result of the whole convolution remains unchanged. By such a transform operation, the number of channels may be increased. As for a first-layer network of the convolutional neural network, the convolution kernel is adjusted from [7, 7, 3, 64] to [1, 1, 147, 64], and the number of channels is increased from 3 to 3×7×7=147. Thus, the computing power of the matrix operation unit can be fully utilized. Therefore, in step S10, the initial convolution kernel [R, S, C, K] may be transformed to obtain the operation convolution kernel [1, 1, (C×R×S), K], thereby achieving a change in a layout of the convolution kernel.

For example, the layout of the convolution kernel may be changed offline because the convolution kernel used by a neural network model at a deployment stage is fixed and does not vary with varying input. Therefore, the convolution kernel may be preprocessed into a desired layout. In the embodiments of the present disclosure, the convolution kernel [R, S, C, K] needing to be used may be set to [1, 1, (C×R×S), K] at the deployment stage of the neural network model, which is used as a convolution kernel for subsequent use. For example, a code corresponding to the initial convolution kernel [R, S, C, K] may be modified using a high-level language (e.g., Python) at a model compiling stage, thereby obtaining the operation convolution kernel [1, 1, (C×R×S), K]. As a matter of course, the embodiments of the present disclosure are limited thereto. The initial convolution kernel [R, S, C, K] needing to be used may also be adjusted before the convolution operation is performed each time, so as to obtain the operation convolution kernel [1, 1, (C×R×S), K] actually used in the current operation.

Referring back to FIG. 2, in step S20, the layout of the input data is adjusted based on the number of channels of the operation convolution kernel to obtain the target data. For example, the size and the number of channels of the target data are different from the size and the number of channels of the input data, and the number of channels of the target data is equal to the number of channels of the operation convolution kernel. Taking the first-layer convolution of the residual network ResNet50 as an example, the calculation that ought to be computed is [1, 224, 224, 3]×[7, 7, 3, 64]=[1, 112, 112, 64]. Since the convolution kernel is adjusted to [1, 1, 147, 64], in order to guarantee that the computation result does not vary, the layout of the input data needs to be adjusted such that the operation turns into [1, 112, 112, 147]×[1, 1, 147, 64]=[1, 112, 112, 64]. Thus, it can be known that the data obtained after adjusting the input data is [1, 112, 112, 147]. For example, the data obtained after adjusting the layout of the input data is referred to as the target data, and the target data is final data for the convolution operation with the operation convolution kernel. For example, since the layout has been adjusted, the size and the number of channels of the target data are different from the size and the number of channels of the input data. As can be known from the above calculation formula, the number of channels of the target data is equal to the number of channels (e.g., 147 in the above example) of the operation convolution kernel, thereby facilitating the convolution operation of both.

For example, the number of channels of the target data is greater than the number of channels of the input data and the number of channels of the operation convolution kernel is greater than the number of channels of the initial convolution kernel, thereby achieving an increase in the number of channels and then taking full utilization of the computing power of the matrix operation unit. For example, in the above example, the number of channels of the input data and the number of the initial convolution kernel are both 3, and the number of channels of the target data and the number of channels of the operation convolution kernel are both 147, thereby achieving the increase in the number of channels. For example, the conversion of the layout of the input data needs to be completed online. That is, the layout of data input each time needs to be adjusted at a reasoning stage of the neural network.

Figure 4:
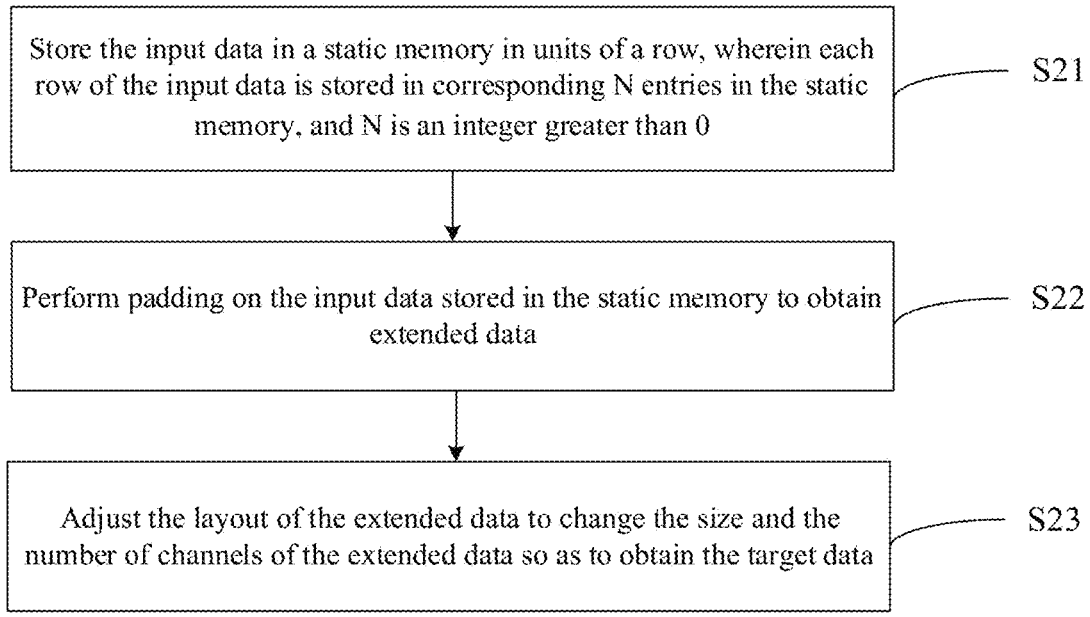
FIG. 4 is a schematic flowchart of step S20 in FIG. 2.

FIG. 4 is a schematic flowchart of step S20 in FIG. 2. For example, in some examples, as shown in FIG. 4, step S20 may further include steps S21 to S23.

Step S21: storing the input data in a static memory in units of a row, wherein each row of the input data is stored in corresponding N entries in the static memory, N being an integer greater than 0;

Step S22: performing padding on the input data stored in the static memory to obtain extended data; and Step S23: adjusting a layout of the extended data to change a size and a number of channels of the extended data so as to obtain the target data.

For example, in step S21, the input data is firstly stored in the static memory which is disposed in a hardware accelerator. The static memory is, for example, a static random access memory (SRAM). The input data is stored in the static memory in units of a row. That is, each row of the input data is stored in corresponding N entries in the static memory, and N is an integer greater than 0. For example, the input data may be transmitted to the static memory using the data flow shown in FIG. 1.

Figure 5:
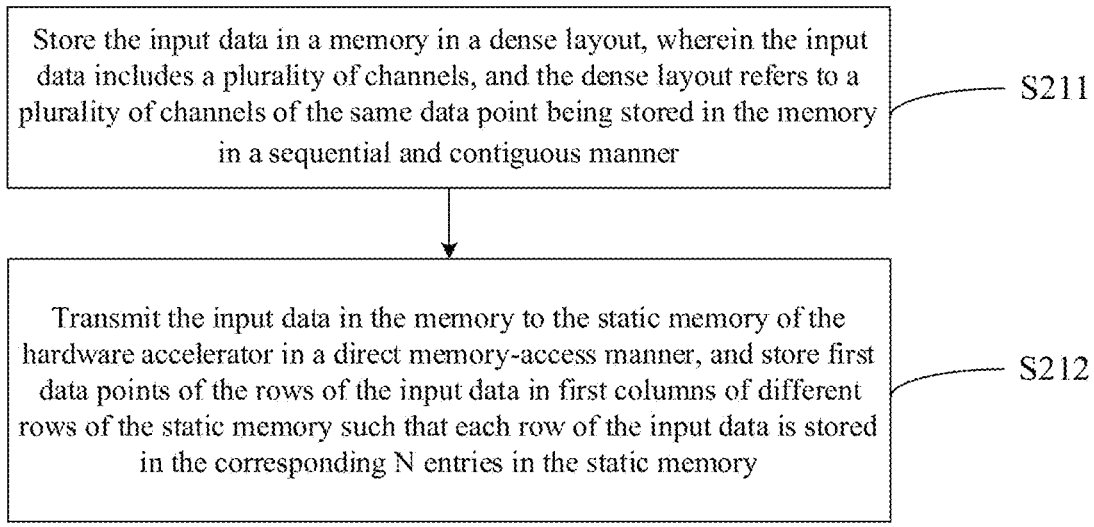
FIG. 5 is a flowchart of step S21 in FIG. 4.

As shown in FIG. 5, step S21 may further include steps S211 to S212.

Step S211: storing the input data in a memory in a dense layout, wherein the input data includes a plurality of channels, and the dense layout refers to a plurality of channels of the same data point being stored in the memory in a sequential and contiguous manner; and Step S212: transmitting the input data in the memory to the static memory of the hardware accelerator in a direct memory access manner, and storing first data points of the rows of the input data in first columns of different rows of the static memory such that each row of the input data is stored in the corresponding N entries in the static memory.

Figure 6:
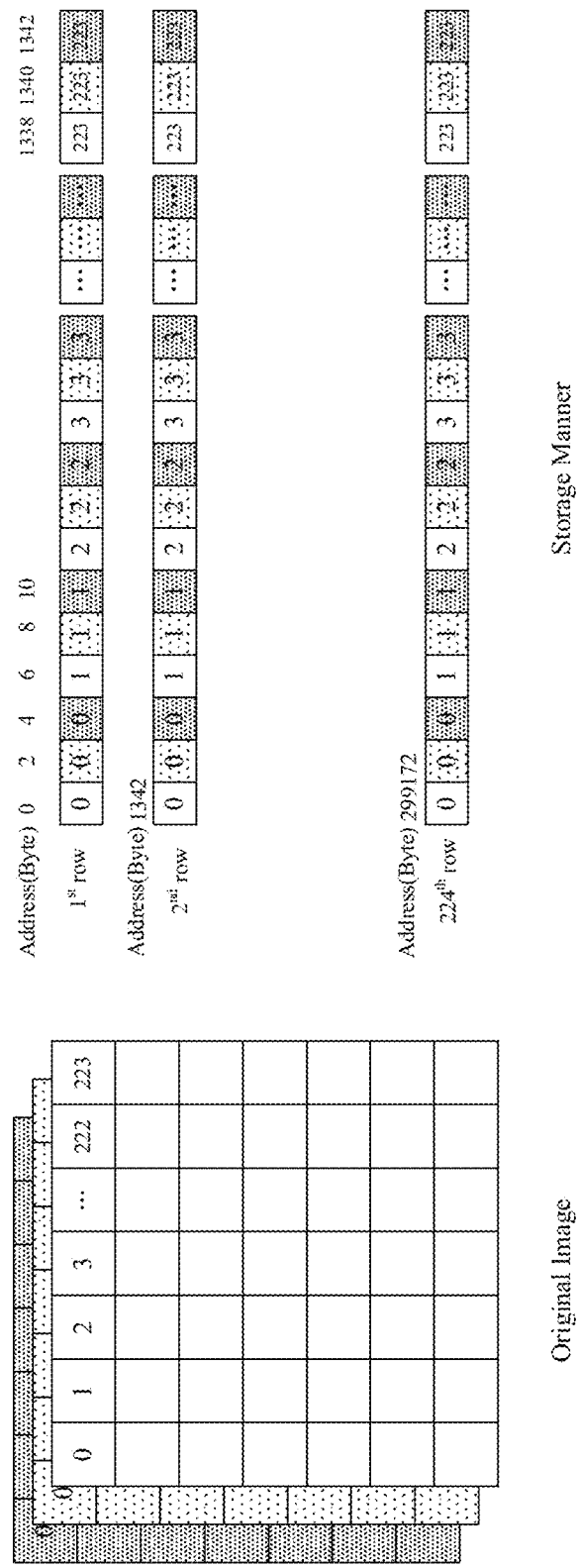
FIG. 6 is a schematic diagram of a storage manner of input data in a memory in a convolution operation method provided by some embodiments of the present disclosure.

For example, in step S211, the dense layout is, for example, a channel align tensor layout. The input data includes a plurality of channels, and the dense layout refers to a plurality of channels of the same data point being stored in the memory in a sequential and contiguous manner. As shown in FIG. 6, in some examples, the input data to the first-layer convolution is [1, 224, 224, 3], wherein the number 1 represents Batch Size=1, one number 224 represents Height=224, while the other number 224 represents Width=224, and the number 3 represents Channel=3. That is, the input data is a 3-channel picture with a size of 224×224. In order to reduce the memory space of the data on a host, the data is stored in the dense layout. For example, for pixels of the first row and the first column of the input data, values of 3 channels thereof are stored on memory space successively and continuously. Next, pixels on the first row and the second column are stored continuously, and values of 3 channels thereof are stored on the memory space successively and continuously, and so on.

For example, the value of each channel of each pixel is expressed in an FP16 data format, which occupies an address space of 2 Bytes. The input picture to the initial layer occupies a total of 224×224×3×2Byte=301056 Bytes, i.e., 294 KB. Here, the data format used and the occupied address space are both exemplary, which does not impose limitations on the embodiments of the present disclosure.

For example, in step S212, the input data in the memory is transmitted to the static memory of the hardware accelerator in the direct memory access (DMA) manner. A data moving manner may be the way shown in FIG. 1. The input data to the first-layer convolution is moved from the host to the DDR of the device via PCIe. The storage manner of the input data in the DDR is consistent with the storage manner of the input data in the memory of the host. Thus, the Host2Device process of a one-dimensional (1D) tensor is realized. For example, the input data is continuously stored in the DDR, e.g., occupying 294 KB. Then, the input data needs to be transmitted to the static memory. That is, the 294 KB data needs to be moved from the DDR to the SRAM in a processing engine (PE, also referred to the hardware accelerator).

For example, when storing, the first data points of the rows of the input data are stored in the first columns of different rows of the static memory such that each row of the input data is stored in the corresponding N entries in the static memory.

Figure 7:
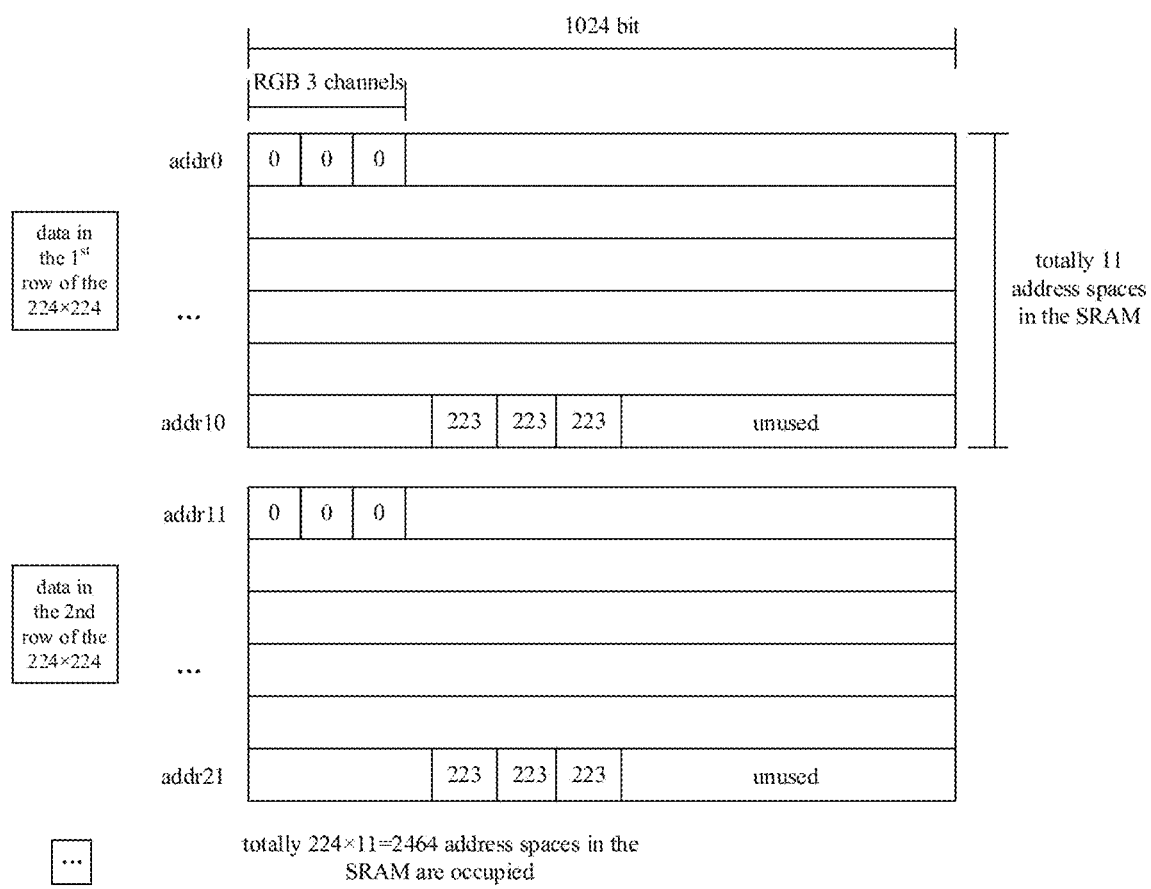
FIG. 7 is a schematic diagram of a storage manner of input data in a static memory in a convolution operation method provided by some embodiments of the present disclosure.

As shown in FIG. 7, in some examples, an organization form of the SRAM may be abstracted as a table of M rows and N columns, and one piece of data is stored in each table. Since the size of the input data is 224×224, the input data is logically divided into 224 rows, and a start location of each row is in the first column of a certain row of the SRAM. Due to a limited number of columns of the SRAM, it is difficult to completely store one row of the input data in one row of the SRAM. Therefore, one row of the input data is scattered to a plurality of rows of the SRAM, i.e., different SRAM addresses. For the input data of [1, 224, 224, 3], in consideration of data padded by subsequent padding, each row has 229 points and each point has 3 channels. For the SRAM of which the memory space of each row is 1024 bits, a number of rows of the SRAM needed to store a row of data is: ceil(229*3/64)=11, ceil representing rounding up to an integer. That is, a row of data points of the input data may be correspondingly stored in 11 entries of the SRAM. In this example, N=11, and the whole input data occupies 224×11=2464 rows of the SRAM.

As shown in FIG. 7, the left represents that the input data is continuously stored in the DDR with no concepts of H, W, and C; and the right represents, after being moved to the SRAM by DMA, the data is split in the SRAM according to the rows of the input data, each row of data occupying a certain amount of SRAM space (e.g., 11 entries). Thus, data moving from the DDR to the SRAM in the DDR is realized, and conversion from the 1D tensor to a two-dimensional (2D) tensor is completed.

The process of moving by DMA is briefly described below.

Assuming that the input data is stored in a continuous DDR space beginning with a source address (source_address), the first row of data of 224×3×2 Bytes=1344 Bytes needs to be firstly moved to a continuous SRAM space beginning with a destiny address. Since one row of the SRAM is 128 Bytes, the 1344 Bytes need to be stored in ceil (1344/128)=11 rows of SRAM. That is, DMA needs to continuously send data of 11×128 Bytes. After completing the moving of the first row of data, DMA needs to cause a read address to jump from the source_address to a location of source_address+1344 Bytes, i.e., a DDR address of the start of the second row of the actual input data. Then, 11×128 Bytes are continuously moved to the SRAM space beginning with destiny_address+11. In a similar fashion, after completing moving for 224 times, all the input data has been transferred from the DDR to the SRAM in the processing engine, i.e., completing the conversion from the 1D tensor to the 2D tensor.

It needs to be noted that the volume of data of 11×128 Bytes sent each time is greater than an actual data volume of each row, i.e., also includes the data of next row. However, since a start address sent each time is accurate, the data itself may not be affected even though the data is sent repeatedly, and the redundant data will not affect subsequent processing.

Referring back to FIG. 4, for example, in step S22, padding is performed on the input data stored in the static memory to obtain the extended data. Here, the extended data refers to data obtained after padding is performed. For example, in some examples, assuming that the convolution computation needing to be actually completed is [1, 224, 224, 3]×[7, 7, 3, 64]=[1, 112, 112, 64], padding needs to be performed on the input data in up, down, left, and right directions. When padding, each of the left and the top of the input data needs to be padded with 3 points (3 columns padded on the left and 3 rows padded on the top), and each of the right and the bottom of the input data needs to be padded with 2 points (2 columns padded on the left and 2 rows padded on the top). The size of the extended data obtained after padding is performed is [1, 229, 229, 3].

Figure 8:
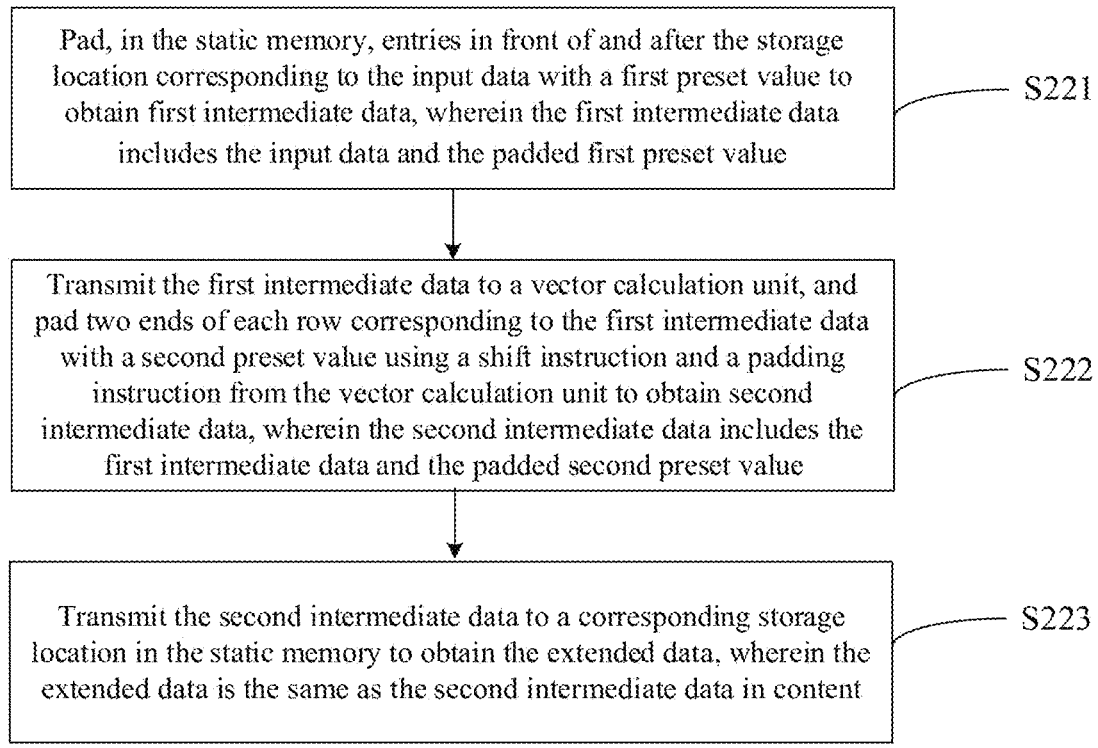
FIG. 8 is a schematic flowchart of step S22 in FIG. 4.

FIG. 8 is a schematic flowchart of step S22 in FIG. 4. As shown in FIG. 8, step S22 may further include steps S221 to S223.

Step S221: in the static memory, padding entries in front of and after a storage location corresponding to the input data with a first preset value to obtain first intermediate data, wherein the first intermediate data includes the input data and the padded first preset value;

Step S222: transmitting the first intermediate data to a vector calculation unit, and padding two ends of each row corresponding to the first intermediate data with a second preset value using a shift instruction and a padding instruction from the vector calculation unit to obtain second intermediate data, wherein the second intermediate data includes the first intermediate data and the padded second preset value; and Step S223: transmitting the second intermediate data to a corresponding storage location in the static memory to obtain the extended data, wherein the extended data is the same as the second intermediate data in content.

For example, in step S221, the entries in front of and after the storage location corresponding to the input data in the static memory are padded with the first preset value to obtain the first intermediate data, wherein the first intermediate data includes the input data and the padded first preset value. For example, padding on the top and the bottom of the input data is performed in this step. For example, in some examples, the SRAM space required by top padding needs to be reserved in the vicinity of the destiny address of the SRAM. That is, a plurality of rows of data need to be inserted before the first row of the actual input data. Padding is performed on the top and the bottom using the vector calculation unit in the hardware accelerator. For example, the padded first preset value is usually 0, and therefore, a value of all 0 needs to be written at a plurality of address before and after the memory space of the input data in the SRAM, thereby obtaining the first intermediate data. The first intermediate data is data padded on the top and the bottom, and the first intermediate data is not padded on the left and the right.

For example, in step S222, the first intermediate data is transmitted to the vector calculation unit, and the two ends of each row corresponding to the first intermediate data are padded with the second preset value using the shift instruction (e.g., vshiftri instruction) and the padding instruction (e.g., SI2V instruction) from the vector calculation unit to obtain the second intermediate data. The second intermediate data includes the first intermediate data and the padded second preset value. For example, padding on the left and the right of the first intermediate data is performed.

For example, in some examples, data on 2464 address spaces in the SRAM is grouped according to every 11 rows, successively sent to the vector calculation unit, and stored in the memory space vmem in the vector calculation unit. The vector calculation unit then shifts the data as a whole rightwards using the vshiftri instruction, leaving space for padding on the left side, and writes the corresponding second preset value (e.g., usually set to 0) to these locations using the SI2V instruction afterwards. For padding on the right side, after the data is shifted rightwards as a whole, the corresponding second preset value is written after the first row and the last column of the input data. If the padded data volume is too large, the vmem space needs to be additionally increased as required. For example, left padding and right padding may be performed on a plurality of sets of data of 11 rows in a pipeline manner to improve the processing efficiency.

For example, in step S223, the second intermediate data is transmitted to the corresponding storage location in the static memory to obtain the extended data. The extended data is the same as the second intermediate data in content. That is, the second intermediate data in vmem which has been padded is written back to the corresponding address space in the SRAM. The data stored in the SRAM and having been padded is called the extended data.

It needs to be noted that step S22 may be omitted when there is no need to perform the padding on the input data. Moreover, in an embodiment of the present disclosure, with respect to a case where the padding needs to be performed, up and down padding may be performed first, followed by left and right padding; or left and right padding may be performed first, followed by up and down padding. A specific padding order is not limited. The instructions used when performing the padding are not limited to the vshiftri instruction and the SI2V instruction, and other suitable instructions may be used as long as the padding can be achieved, which will not be limited in the embodiments of the present disclosure.

Referring back to FIG. 4, for example, in step S23, the layout of the extended data is adjusted to change the size and the number of channels of the extended data, thereby obtaining the target data. That is, in order to match the operation convolution kernel and guarantee that the operation result remains unchanged, the layout of the extended data needs to be adjusted to change the size and the number of channels thereof. For example, the number of channels of the resulting target data from the adjustment is equal to the number of channels of the operation convolution kernel, and the target data is expressed as [1, ht, wt, (C×R×S)], ht and wt both being integers greater than 0.

Figure 9:
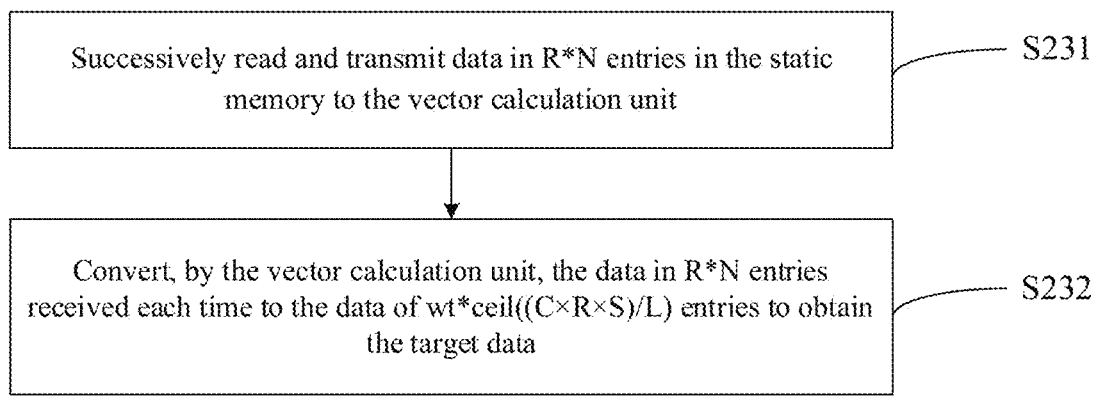
FIG. 9 is a schematic flowchart of step S23 in FIG. 4.

FIG. 9 is a schematic flowchart of step S23 in FIG. 4. As shown in FIG. 9, step S23 may further include steps S231 to S232.

Step S231: successively reading and transmitting data in R*N entries in the static memory to the vector calculation unit; and Step S232: converting, by the vector calculation unit, the data in R*N entries received each time to the data of wt*ceil((C×R×S)/L) entries to obtain the target data.

For example, in step S231, the data in R*N entries in the static memory is read each time and transmitted to the vector calculation unit such that the vector calculation unit converts the data in R*N entries received each time. For example, a start address of each read is shifted by str*N entries according to a preset stride str. The preset stride is a stride of a feature window required to perform a convolution operation on the input data and initial convolution kernel in a row direction and a column direction; and a total number of reads of data from the static memory is equal to ht.

For example, in some examples, still taking the first-layer convolution of the residual network ResNet50 as an example, the initial convolution kernel is [R, S, C, K]=[7, 7, 3, 64], and therefore, R=7. The input data is [1, 224, 224, 3]. One row of the input data is stored in N entries of the SRAM. If one row of space of the SRAM is 128 Bytes, N=11. Therefore, data in R*N=77 entries in the static memory is read each time and transmitted to the vector calculation unit, and the data stored in 77 entries corresponds to one row of the input data 224×224. For example, the stride of the feature window required to perform the convolution operation on the input data [1, 224, 224, 3] and the initial convolution kernel [7, 7, 3, 64] in the row direction and the column direction is 2. Therefore, the preset stride str is 2. The start address of each read is shifted by str*N (i.e., 2×11=22) entries according to the preset stride str such that the read data is consistent with the original data included by the feature window when the convolution operation is performed. As can be known from the equation [1, 224, 224, 3]×[7, 7, 3, 64]=[1, 112, 112, 147]×[1, 1, 147, 64]=[1, 112, 112, 64], the convolution kernel is transformed to [1, 1, 147, 64] and the target data [1, ht, wt, (C×R×S)] needing to be obtained by transformation is [1, 112, 112, 147]; therefore, ht=112 and wt=112. For example, the total number of reads of data from the static memory is equal to ht (e.g., 112). The data read each time corresponds to one row of the target data after conversion.

For example, in step S232, the vector calculation unit converts the data in R*N entries received each time to the data of wt*ceil((C×R×S)/L) entries, and the converted data is the target data. That is, the layout of the data is adjusted to change the size and the number of channels of the data. For example, in the calculation formula, L represents a number of data points storable by each entry in the static memory; and ceil((C×R×S)/L) represents rounding up (C×R×S)/L to an integer. For example, in some examples, the vector calculation unit receives the data of 7×11 entries each time. If one row of space of the SRAM is 128 Bytes, the number L of data points storable by each entry is 64. For the initial convolution kernel [7, 7, 3, 64], R=7, S=7, and C=3. For the case of the target data [1, ht, wt, (C×R×S)]=[1, 112, 112, 147], wt=112. Therefore, wt*ceil((C×R×S)/L) =112×3. That is, the vector calculation unit converts the data in 7×11 entries received each time to the data of 112×3 entries.

Figure 10:
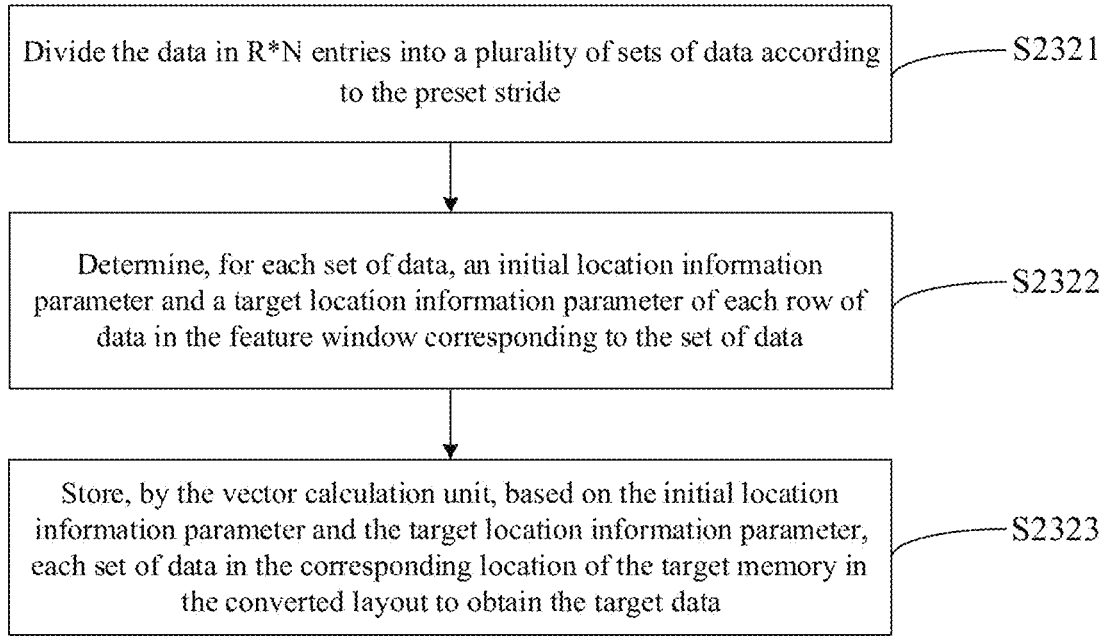
FIG. 10 is a schematic flowchart of step S232 in FIG. 9.

FIG. 10 is a schematic flowchart of step S232 in FIG. 9. For example, in some examples, step S232 further includes steps S2321 to S2323.

Step S2321: dividing the data in R*N entries into a plurality of sets of data according to the preset stride;

Step S2322: for each set of data, determining an initial location information parameter and a target location information parameter of each row of data of the feature window corresponding to the set of data; and Step S2323: storing, by the vector calculation unit based on the initial location information parameter and the target location information parameter, each set of data in the corresponding location of the target memory in the converted layout to obtain the target data.

For example, in step S2321, the data in R*N entries is divided into a plurality of sets of data according to the preset stride, wherein each set of data corresponds to one feature window in the row direction, and a number of the plurality of sets of data is equal to wt. For example, in some examples, the data in 7×11 entries is divided into 112 sets of data according to the preset stride str=2, and wt=112. The data in 7×11 entries corresponds to one row of data of the input data 224×224, and the divided 112 sets of data correspond to 112 feature windows performed on one row of data 224 with the stride 2.

For example, in step S2322, for each set of data, the initial location information parameter and the target location information parameter of each row of data of the feature window corresponding to the set of data are determined. The initial location information parameter is used to determine the source address of the row of data in the feature window, and the target location information parameter is used to determine the destiny address to which these data is moved.

An operation mode of steps S2321 to S2322 is described below by way of example.

Figure 11:
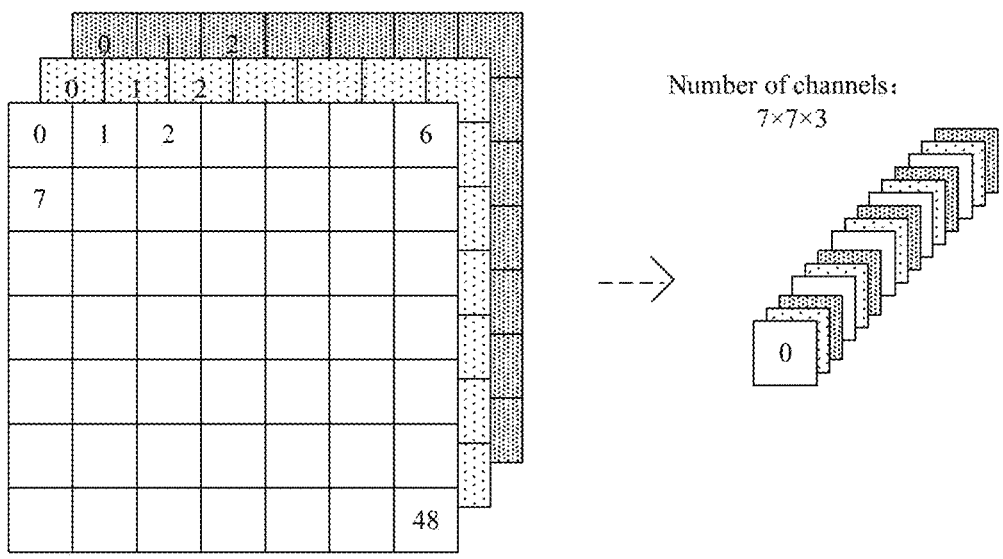
FIG. 11 is schematic diagram I of varying a data layout in a convolution operation method provided by some embodiments of the present disclosure.

For example, after the up and down, and left and right padding performed on the input data [1, 224, 224, 3], the size of the entire input data is changed to [1, 229, 229, 3], occupying 229×11 address spaces in the SRAM. Next, the shape of the input data needs to be converted to [1, 112, 112, 147]. Essentially, for the convolution operation, each feature window to which the convolution kernel slides needs to accomplish the conversion from [7×7×3] to [1, 1, 147] as shown in FIG. 11.

Since each feature to which the convolution kernel slides corresponds to 7 rows and 7 columns of the original data (the input data or the input image), and the feature windows swept by the convolution kernel during sliding from the top left to the bottom right may have an overlap. For an overlap in the column direction, in order to avoid repeatedly reading data from the SRAM, the data of 7×11=77 address spaces is read from the SRAM each time and transferred to the vector calculation unit for processing. For an overlap in the row direction, the feature window would repeatedly read overlapping data in the row direction while sliding from the left to the right. Entirely, the data in the SRAM is divided into 112 sets of data, which correspond to converted 112 rows. Each set of data occupies 7×11 address spaces before conversion. After reading one set of data, the vector calculation unit processes the data and outputs a data size of 112×3 address spaces, wherein 112 corresponds to a data width after conversion, and 3 corresponds to the space occupied by 147 channels (147 channels need to occupy 3 SRAM entries, i.e., 3 SRAM address spaces).

After the vector calculation unit fetches one set of data, the data on the 7×11 SRAM entries will be temporarily stored on vmem within the vector calculation unit, and the data layout remains unchanged. The data is then converted to the data of 112×3 vmem entries using an instruction operation from the vector calculation unit. A result is then written back to the SRAM.

Figure 12:
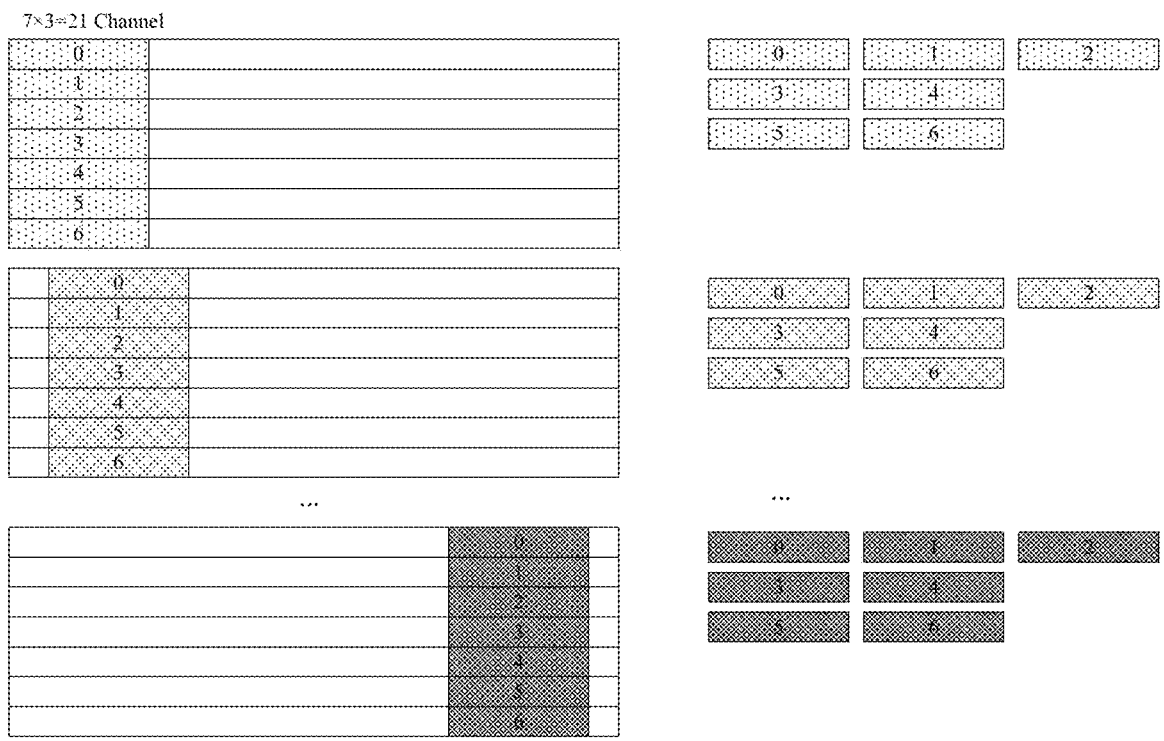
FIG. 12 is schematic diagram II of varying a data layout in a convolution operation method provided by some embodiments of the present disclosure.

The data width after conversion is 112 points in the row direction, and each point has 147 channels, which are distributed on 3 vmem entries. For each point in the row direction, the feature window corresponding to original 7×7×3 needs to be converted to 1×1×147. For this, corresponding 7 rows of data in each feature window need to be found and then are reorganized into a new data layout. As shown in FIG. 12, for a first feature window, the data width of the feature window is 7×3=21 channels and covers a total of 7 rows of data (correspondingly stored in 7×11 entries). The storage addresses of the 7 rows of data need to be determined and then the layout thereof needs to be converted. Referring to the right of FIG. 12, the 7 rows of data are rearranged into 3 rows, with the original rows 0, 1, and 2 constituting a new first row, the original rows 3 and 4 constituting a new second row, and the original rows of 5 and 6 constituting a new third row. The new 3 rows store a total of 147 data points covered within the feature window corresponding to original 7×7×3. In a similar fashion, for next feature window in the row direction, the layout of the data is still converted similarly until one row of feature windows corresponding to the 7 rows of data has been converted completely. Subsequently, next set of data of 7×11 entries is read.

To determine an initial location and a target location of each row of data in the feature window, the initial location information parameter and the target location information parameter need to be defined for each row of data in the feature window.

The initial location information parameter includes a first start boundary coordinate, a first end boundary coordinate, a first start address, a first end address, a first start serial number, and a first end serial number.

The first start boundary coordinate represents a relative coordinate of a start boundary of the corresponding feature window in the row direction of the extended data, and the first end boundary coordinate represents a relative coordinate of an end boundary of the corresponding feature window in the row direction of the extended data. The start boundary of the corresponding feature window and the end boundary of the corresponding feature window are located at different locations in the row direction of the extended data. The data obtained after the padding is performed is the extended data, and therefore, these coordinates and parameters are defined for the extended data. For other cases where there is no need to perform the padding, these coordinates and parameters may be defined directly for the input data. As shown in FIG. 12, the start boundary is, for example, a left boundary of the feature window, and the first start boundary coordinate is the relative coordinate of the left boundary of the feature window in the row direction of the extended data of 229×3. The end boundary is, for example, a right boundary of the feature window, and the first end boundary coordinate is the relative coordinate of the right boundary of the feature window in the row direction of the extended data of 229×3.

A calculation formula for the first start boundary coordinate is src_row_start_index=i*str*ch. src_row_start_index represents the first start boundary coordinate; i represents a serial number of a corresponding data point of the corresponding feature window in the size wt of the target data (e.g., represents which one the feature window is among a row of, a total of 112, feature windows, i.e., which one it is in the width wt=112 of the output data); str represents a stride (e.g., 2) of the feature window in the row direction; and ch represents the number (e.g., 3) of channels of the input data.

A calculation formula for the first end boundary coordinate is src_row_end_index=src_row_start_index+ (kernel_w*ch−1). src_row_end_index represents the first end boundary coordinate; kernel_w represents a width (e.g., 7) of the feature window; and a size of the feature window is equal to the size of the initial convolution kernel (e.g., both 7×7).

The first start address represents an address of the first start boundary coordinate in a memory (e.g., vmem) of the vector calculation unit, and the first end address represents an address of the first end boundary coordinate in the memory (e.g., vmem) of the vector calculation unit. The first start serial number represents a serial number of a data point corresponding to the first start boundary coordinate at the first start address, and the first end serial number represents a serial number of a data point corresponding to the first end boundary coordinate at the first end address. Since vmem allows for storage in units of the row, a certain entry in vmem can be located according to the first start address or the first end address. The first start serial number or the first end serial number represents which data the corresponding data is in the entry.

A calculation formula for the first start address is src_row_start_address=src_row_start_index/vmem_lane+ j*N. src_row_start_address represents the first start address; vmem_lane represents a number of data points storable by each entry in the memory of the vector calculation unit; and j represents a row serial number (e.g., a number of 1 to 7) of the corresponding data in the feature window.

A calculation formula for the first end address is src_row_end_address=src_row_end_index/vmem_lane+ j*N. src_row_end_address represents the first end address.

A calculation formula for the first start serial number is src_row_start_lane=src_row_start_index % vmem_lane. src_row_start_lane represents the first start serial number. For example, % represents a modulo operation.

A calculation formula for the first end serial number is src_row_end_lane=src_row_end_index % vmem_lane. src_row_end_lane represents the first end serial number.

After the above parameters are determined, the location of the source data required to convert 7×7×3 in vmem can be determined. In order to transfer these source data to the destiny address of vmem, the corresponding destiny address and related parameters also need to be determined. That is, the target location information parameter needs to be determined.

The target location information parameter includes a second start boundary coordinate, a second end boundary coordinate, a second start address, a second end address, a second start serial number, and a second end serial number.

The second start boundary coordinate represents a relative coordinate of the start boundary of the corresponding feature window in a data size of [1, 1, (C×R×S)], and the second end boundary coordinate represents a relative coordinate of the end boundary of the corresponding feature window in the data size of [1, 1, (C×R×S)]. The start boundary of the corresponding feature window and the end boundary of the corresponding feature window are located at different locations in the row direction of the extended data. For example, the target data is expressed as [1, ht, wt, (C×R×S)]. In some examples, the target data is [1, 112, 112, 147], and the data size corresponding to each feature window needs to be converted from [7, 7, 3] to [1, 1, 147]. As shown in FIG. 12, the start boundary is, for example, the left boundary of the feature window, and the second start boundary coordinate is the relative coordinate of the left boundary of the feature window in the data size of [1, 1, 147]. The end boundary is, for example, the right boundary of the feature window, and the second end boundary coordinate is the relative coordinate of the right boundary of the feature window in the data size of [1, 1, 147].

A calculation formula for the second start boundary coordinate is dst_row_start_index=j*kernel_w*ch. dst_row_start_index represents the second start boundary coordinate; j represents a row serial number (e.g., a number of 1 to 7) of the corresponding data in the feature window; kernel_w represents the width (e.g., 7) of the feature window; the size of the feature window is equal to the size of the initial convolution kernel (e.g., both 7×7); and ch represents the number (e.g., 3) of channels of the input data.

A calculation formula for the second end boundary coordinate is dst_row_end_index=dst_row_start_index+(kernel_w*ch−1). dst_row_end_index represents the second end boundary coordinate.

The second start address represents an address of the second start boundary coordinate in the memory (e.g., vmem) of the vector calculation unit, and the second end address represents an address of the second end boundary coordinate in the memory (e.g., vmem) of the vector calculation unit. The second start serial number represents a serial number of a data point corresponding to the second start boundary coordinate at the second start address, and the second end serial number represents a serial number of a data point corresponding to the second end boundary coordinate at the second end address. Since vmem allows for storage in units of the row, a certain entry in vmem can be located according to the second start address or the second end address. The second start serial number or the second end serial number represents which data the corresponding data is in the entry.

A calculation formula for the second start address is dst_row_start_address=dst_row_start_index/vmem_lane. dst_row_start_address represents the second start address; and vmem_lane represents the number of data points storable by each entry in the memory of the vector calculation unit.

A calculation formula for the second end address is dst_row_end_address=dst_row_end_index/vmem_lane. dst_row_end_address represents the second end address.

A calculation formula for the second start serial number is dst_row_start_lane=dst_row_start_index % vmem_lane. dst_row_start_lane represents the second start serial number.

A calculation formula for the second end serial number is dst_row_end_lane=dst_row_end_index % vmem_lane. dst_row_end_lane represents the second end serial number.

After the initial location information parameter and the target location information parameter are determined, a source address and a destiny address required for data transfer can be determined. Next, the source data may be moved to the destiny address according to these parameters.

For example, in step S2323, after he initial location information parameter and the target location information parameter are determined, the vector calculation unit stores each set of data in the corresponding location of the target memory in the converted layout. The destiny address indicated by the target location information parameter is the address in the target memory. Thus, the target data is obtained. For example, the target memory allows for storage in units of the row. The data transmitted to the target memory and stored on the target memory is the target data. For example, the target memory may be the static memory described above (in this case, the data before conversion and the data after conversion are stored at different address of the static memory), or may be other storage device than the static memory described above, which will not be limited in the embodiments of the present disclosure.

For example, step S2323 may further include: based on the initial location information parameter and the target location information parameter, splicing, by the vector calculation unit using a cyclic shift instruction and according to a preset enable signal in a vector predicate register, each set of data in the converted layout and storing the data in the corresponding location of the target memory to obtain the target data. For example, in some examples, the data of the source address may be cyclically shifted rightwards by a plurality of locations using the vshiftri instruction in an instruction set architecture of the vector calculation unit (Vector ISA), and then written to the destiny address according to the write enable signal in the vector predicate register (also referred to as VR register). The preset enable signal described previously is, for example, the write enable signal. In a splicing process of converting the data corresponding to the feature window of 7×7×3 to the data of 1×1×147, the VR register used needs to be determined according to the second start serial number dst_row_start_lane and the second end serial number dst_row_end_lane. For the vshiftri instruction and a way of using the VP register, a reference may be made to a conventional design, which will no longer be described in detail here.

In the above-mentioned way, conversion from the 2D tensor to a three-dimensional (3D) tensor is completed using the vector calculation unit.

After processing of the steps, the input data [1, 224, 224, 3] is converted to the target data [1, 112, 112, 147], and the operation convolution kernel determined according to the initial convolution kernel [7, 7, 3, 64] is [1, 1, 147, 64], resulting an increase in the number of channels from 3 to 147.

Referring back to FIG. 2, in step S30, the convolution operation is performed based on the target data and the operation convolution kernel to obtain a convolution result. The convolution operation result of the target data and the operation convolution kernel is equal to a convolution operation result of the input data and the initial convolution kernel. For example, step S30 may further include: performing the convolution operation on the target data and operation convolution kernel using a matrix operation unit (Matrix).

For example, in some examples, taking the first-layer convolution of the residual network ResNet50 as an example, the operation on the input data and the initial convolution kernel needing to be realized is [1, 224, 224, 3]×[7, 7, 3, 64]=[1, 112, 112, 64]. Since there are only 3 channels, the computing power of the matrix operation unit is not fully utilized. By using the convolution operation method provided by the embodiments of the present disclosure, the operation convolution kernel obtained based on the initial convolution kernel [7, 7, 3, 64] is [1, 1, 147, 64], and the target data obtained by adjusting the layout of the input data [1, 224, 224, 3] is [1, 112, 112, 147]. Therefore, the actually performed operation on the target data and the operation convolution kernel is [1, 112, 112, 147]×[1, 1, 147, 64]=[1, 112, 112, 64]. The convolution operation result is consistent with the convolution operation result intended to be obtained. Since the number of channels is increased to 147, the computing power of the matrix operation unit can be fully utilized; the utilization ratio of the matrix operation unit can be increased; the time of the convolution operation can be shortened; and the operation efficiency can be improved. Moreover, since it is unnecessary to adjust the layout of the input data again using the host CPU and increase the number of channels on the host, the occupied data space would not be increased significantly, and the data volume transmitted from the host to the device would not be increased. Therefore, the PCIe transmission time of Host2Device would not be increased, thereby saving the data transmission time.

The convolution operation method provided by the embodiments of the present disclosure helps achieve the purpose of hardware acceleration, can realize acceleration of the first-layer convolution calculation of the convolutional neural network (CNN), and has the characteristics such as small storage space, short transmission time, high hardware module utilization ratio, and short calculation time. For example, the time needed to perform the first-layer convolution of the residual network ResNet50 using the common convolution operation method is 614656 cycles, and the theoretical time taken to perform the first-layer convolution of the residual network ResNet50 using the convolution operation method provided by the embodiments of the present disclosure is 37632 cycles, which is reduced to 6.1% of the former. This greatly shortens the first-layer convolution calculation time of the convolutional neural network (CNN).

It needs to be noted that in the embodiments of the present disclosure, the flow of the convolution operation method provided in the foregoing embodiments of the present disclosure may include more or less operations, and these operations may be performed in sequence or performed concurrently. While the flow of the convolution operation method described above includes a plurality of operations occurring in a particular order, it will be clearly understood that the order of the plurality of operations is not limited. The convolution operation method described above may be performed once or may be performed a plurality of times according to a predetermined condition.

It needs to be noted that the foregoing description is made by taking the first-layer convolution of the residual network ResNet50 as an example, which, however, does not impose a limitation on the embodiments of the present disclosure. The convolution operation method by the embodiments of the present disclosure can be applied to any suitable convolution operation, and the sizes and numbers of channels of various types of data and the sizes and numbers of channels of various convolution kernels can be determined according to actual requirements, and are not limited to specific values as described above.

At least one embodiment of the present disclosure further provides a convolution operation apparatus. The convolution operation apparatus can increase the utilization ratio of the matrix operation unit, effectively utilize the computing power of the matrix operation unit, shorten the time of the convolution operation, improve the operation efficiency, and save the data transmission time.

Figure 13:
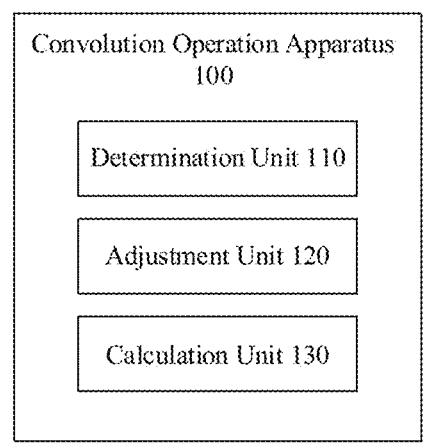
FIG. 13 is a schematic block diagram of a convolution operation apparatus provided by some embodiments of the present disclosure.

FIG. 13 is a schematic block diagram of a convolution operation apparatus provided by some embodiments of the present disclosure. As shown in FIG. 13, in some embodiments, the convolution operation apparatus 100 includes a determination unit 110, an adjustment unit 120, and a calculation unit 130.

The determination unit 110 is configured to determine an operation convolution kernel. For example, the operation convolution kernel is obtained based on an initial convolution kernel; the initial convolution kernel is expressed as [R, S, C, K]; the operation convolution kernel is expressed as [1, 1, (C×R×S), K]; and R, S, C, and K are all integers greater than 0. For example, the determination unit 110 may perform step S10 of the convolution operation method shown in FIG. 2.

The adjustment unit 120 is configured to adjust a layout of input data based on a number of channels of the operation convolution kernel to obtain target data. For example, the size and the number of channels of the target data are different from the size and the number of channels of the input data, and the number of channels of the target data is equal to the number of channels of the operation convolution kernel. For example, the adjustment unit 120 may perform step S20 of the convolution operation method shown in FIG. 2.

The calculation unit 130 is configured to perform a convolution operation based on the target data and the operation convolution kernel to obtain a convolution operation result. For example, the convolution operation result of the target data and the operation convolution kernel is equal to a convolution operation result of the input data and the initial convolution kernel. For example, the calculation unit 130 may perform step S30 of the convolution operation method shown in FIG. 2.

For example, the determination unit 110, the adjustment unit 120, and the calculation unit 130 may be hardware, software, firmware, and any feasible combination thereof. For example, the determination unit 110, the adjustment unit 120, and the calculation unit 130 may be special purpose or general purpose circuits, chips or apparatuses, and may also be a combination of a processor and a memory. The embodiments of the present disclosure have no particular limitation on the specific implementation forms of the determination unit 110, the adjustment unit 120, and the calculation unit 130.

It needs to be noted that in the embodiments of the present disclosure, the units of the convolution operation apparatus 100 correspond to the steps of the convolution operation method described above. Specific functions of the convolution operation apparatus 100 may be known with reference to the related descriptions regarding the convolution operation method described above, which will not be described here redundantly. The components and structures of the convolution operation apparatus 100 shown in FIG. 13 are merely exemplary and non-limiting. As needed, the convolution operation apparatus 100 may further include other components and structures.

At least one embodiment of the present disclosure further provides an electronic device. The electronic device can increase the utilization ratio of the matrix operation unit, effectively utilize the computing power of the matrix operation unit, shorten the time of the convolution operation, improve the operation efficiency, and save the data transmission time.

Figure 14:
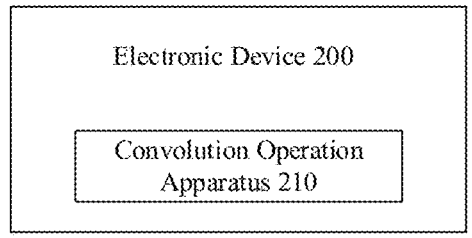
FIG. 14 is a schematic block diagram of an electronic device provided by some embodiments of the present disclosure.

FIG. 14 is a schematic block diagram of an electronic device provided in some embodiments of the present disclosure. As shown in FIG. 14, the electronic device 200 includes a convolution operation apparatus 210. The convolution operation apparatus 210 may be a convolution operation apparatus provided by any embodiment of the present disclosure, e.g., the convolution operation apparatus 100 described above. The electronic device 200 may be any device having a computing function, such as a server, a terminal device, and a personal computer, which will not be limited in the embodiments of the present disclosure.

Figure 15:
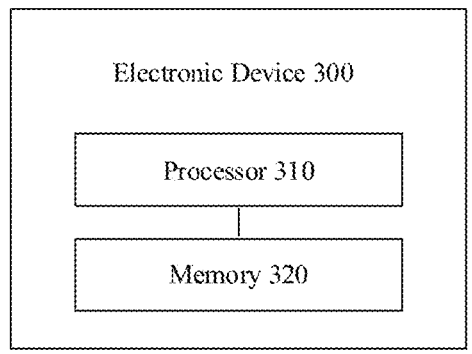
FIG. 15 is a schematic block diagram of another electronic device provided by some embodiments of the present disclosure.

FIG. 15 is a schematic block diagram of another electronic device provided by some embodiments of the present disclosure. As shown in FIG. 15, the electronic device 300 includes a processor 310 and a memory 320, and may be configured to implement a client or a server. The memory 320 is configured to non-transiently store computer-executable instructions (e.g., at least one (one or more) computer program module). The processor 310 is configured to run the computer-executable instructions. The computer-executable instructions may, when run by the processor 310, implement one or more steps of the convolution operation method described above, thereby realizing the convolution operation method described above. The memory 320 and the processor 310 may be interconnected by means of a bus system and/or a connection mechanism in other form (not shown).

For example, the processor 310 may be a central processing unit (CPU), a graphics processing unit (GPU) or a processing unit in other form having data processing capability and/or program executing capability. For example, the CPU may be an X86 or ARM architecture or the like. The processor 310 may be a general-purpose processor or a special purpose processor and may control other components in the electronic device 300 to perform desired functions.

For example, the 320 may include any combination of at least one (one or more) computer program product. The computer program products may include computer readable storage mediums in various forms, e.g., a volatile memory and/or a nonvolatile memory. The volatile memory may include, for example, a random-access memory (RAM) and/or a cache, etc. The nonvolatile memory may include, for example, a read only memory (ROM), a hard disk, an erasable programmable read-only memory (EPROM), a compact disk read-only memory (CD-ROM), a USB memory, a flash memory, etc. One or more computer program modules may be stored on the computer readable storage medium, and the processor 310 may run the at least one (one or more) (e.g., one or more) computer program module to realize various functions of the electronic device 300. Various APPs and various kinds of data as well as various kinds of data used and/or generated by APPs and the like may also be stored on the computer readable storage medium.

It needs to be noted that in the embodiments of the present disclosure, the specific functions and the technical effects of the electronic device 300 may be known with reference to the above description regarding the convolution operation method, which will not be described here redundantly.

Figure 16:
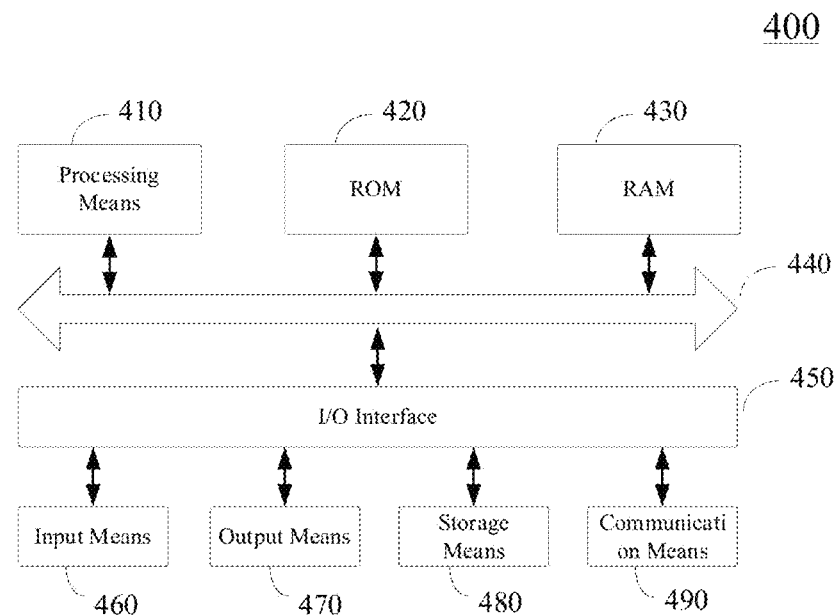
FIG. 16 is a schematic block diagram of another electronic device provided by some embodiments of the present disclosure.

FIG. 16 is a schematic block diagram of another electronic device provided by some embodiments of the present disclosure. For example, the electronic device 400 adapted to implement the convolution operation method provided in the embodiments of the present disclosure. The electronic device 400 may be a terminal device and the like and may be configured to implement a client or a server. The electronic device 400 in the embodiment of the present disclosure may include but not be limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device, and fixed terminals such as a digital TV, a desktop computer, and a smart home device. It needs to be noted that the electronic device 400 shown in FIG. 16 is merely an example and would not pose any limitation on the functions and the range of use of the embodiments of the present disclosure.

As shown in FIG. 16, the electronic device 400 may include a processing means (e.g., a central processing unit, a graphics processing unit) 410, which can perform various suitable actions and processing according to a program stored on the read-only memory (ROM) 420 or a program loaded from the storage means 480 into the random access memory (RAM) 430. The RAM 430 further stores various programs and data required for operations of the electronic device 400. The processing means 410, the ROM 420, and the RAM 430 are interconnected by means of a bus 440. An input/output (I/O) interface 450 is also connected to the bus 440.

Usually, the following means may be connected to the I/O interface 450: an input means 460 including, for example, a touch screen, a touch pad, a keyboard, a mouse, a camera, a microphone, an accelerometer, and a gyroscope; an output means 470 including, for example, a liquid crystal display (LCD), a loudspeaker, and a vibrator; a storage means 480 including, for example, a magnetic tape and a hard disk; and a communication means 490. The communication means 490 may allow the electronic device 400 to be in wireless or wired communication with other electronic devices to exchange data. While FIG. 16 illustrates the electronic device 400 having various means, it is to be understood that all the illustrated means are not necessarily implemented or included. The electronic device 400 may alternatively implement or include more or less means.

For example, according to the embodiments of the present disclosure, the convolution operation method described above may be implemented as a computer software program. For example, an embodiment of the present disclosure provides a computer program product, which includes a computer program carried on a non-transitory computer readable medium. The computer program includes a program code for carrying out the convolution operation method described above. In such an embodiment, the computer program may be downloaded online through a communication means 490 and installed, or installed from a storage means 480, or installed from an ROM 420. When the computer program is executed by a processing means 410, the functions defined in the convolution operation method provided in the embodiments of the present disclosure may be realized.

At least one embodiment of the present disclosure further provides a storage medium. The storage medium can be used to increase the utilization ratio of the matrix operation unit, effectively utilize the computing power of the matrix operation unit, shorten the time of the convolution operation, improve the operation efficiency, and save the data transmission time.

Figure 17:
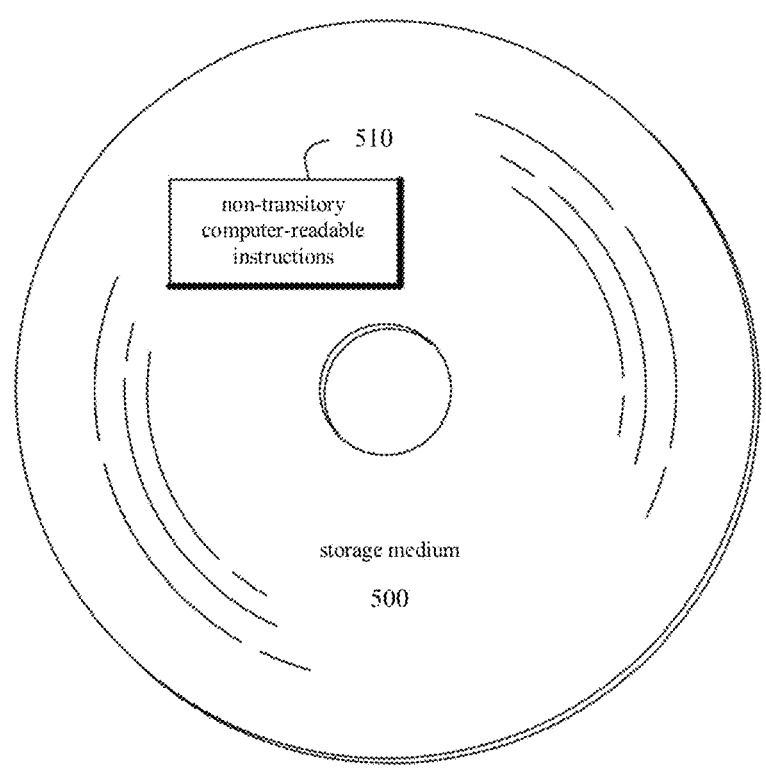
FIG. 17 is a schematic diagram of a storage medium provided by some embodiments of the present disclosure.

FIG. 17 is a schematic diagram of a storage medium provided by some embodiments of the present disclosure. As shown in FIG. 17, the storage medium 500 may be a non-transitory computer readable storage medium that stores non-transitory computer-executable instructions 510. When the non-transitory computer-executable instructions 510 are executed by a processor, the convolution operation method in the embodiments of the present disclosure may be implemented. For example, when the non-transitory computer-executable instructions 510 are executed by the processor, one or more steps of the convolution operation method described above may be performed.

For example, the storage medium 500 may be applied to the electronic device described above. For example, the storage medium 500 may include the memory 320 in the electronic device 300.

For example, the storage medium may include a storage card of a smart phone, a memory component of a tablet computer, a hard disk of a personal computer, a random-access memory (RAM), a read-only memory (ROM), an erasable programmable read-only memory (EPROM), a compact disk read-only memory (CD-ROM), a flash memory, or any combination of such storage mediums, and may also be other suitable storage medium.

For example, the description regarding the storage medium 500 may be known with reference to the description of the memory in the embodiment of the electronic device, which will not be described here redundantly. The specific functions and the technical effects of the storage medium 500 may be known with reference to the above description regarding the convolution operation method, which will not be described here redundantly.

The convolution operation method, the convolution operation apparatus, the electronic device, and the storage medium provided by the embodiments of the present disclosure have been described above in conjunction with FIGS. 1 to 17. The convolution operation method provided by the embodiments of the present disclosure can be applied to the first-layer convolution operation of the convolutional neural network. The number of channels is increased by adjusting the layout of the data such that the convolution operation is performed on the target data having many channels and the operation convolution kernel having many channels. Thus, the utilization ratio of the matrix operation unit can be increased; the computing power of the matrix operation unit can be effectively utilized; the time of the convolution operation can be shortened; the operation efficiency can be improved; and the data transmission time can be saved.

It needs to be noted that in the context of the present disclosure, a computer-readable medium may be a tangible medium that may include or store a program for use by or in combination with an instruction execution system, apparatus or device. The computer-readable medium may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination of them. More specific examples of the computer-readable storage medium may include, but be not limited to, an electrical connection with one or more wires, a portable computer disk, a hard disk, a random-access memory (RAM), a read-only memory (ROM), an erasable programmable read-only memory (EPROM or a flash memory), an optical fiber, a compact disk read-only memory (CD-ROM), an optical storage device, a magnetic storage device, or any appropriate combination thereof. In the present disclosure, the computer-readable storage medium may be any tangible medium that contains or stores a program, and the program may be used by or in combination with an instruction execution system, apparatus, or device. In the present disclosure, the computer-readable signal medium may include a data signal that propagates in a baseband or as a part of a carrier and carries thereon a computer-readable program code. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable storage medium may send, propagate or transmit a program used by or in combination with an instruction execution system, apparatus or device. The program code included on the computer-readable medium may be transmitted by using any suitable medium, including but not limited to an electric wire, a fiber-optic cable, radio frequency (RF) and the like, or any appropriate combination thereof.

In some implementations, a client and a server may communicate by means of any network protocol currently known or to be developed in future such as HyperText Transfer Protocol (HTTP), and may achieve communication and interconnection with digital data (e.g., a communication network) in any form or of any medium. Examples of the communication network include a local area network (LAN), a wide area network (WAN), an Internet work (e.g., the Internet), a peer-to-peer network (e.g., ad hoc peer-to-peer network), and any network currently known or to be developed in future.

The above-mentioned computer-readable medium may be included in the electronic device described above, or may exist alone without being assembled with the electronic device.

A computer program code for performing the operations in the present disclosure may be written in one or more programming languages or a combination thereof. The programming languages include but are not limited to object-oriented programming languages, such as Java, Smalltalk, and C++, and conventional procedural programming languages, such as C or similar programming languages. The program code may be executed fully on a user computer, executed partially on a user computer, executed as an independent software package, executed partially on a user computer and partially on a remote computer, or executed fully on a remote computer or a server. In a circumstance in which a remote computer is involved, the remote computer may be connected to a user computer over any type of network, including a local area network (LAN) or a wide area network (WAN), or may be connected to an external computer (for example, connected over the Internet by using an Internet service provider).

The flowcharts and block diagrams in the accompanying drawings illustrate system architectures, functions and operations that may be implemented by the system, method and computer program product according to the embodiments of the present disclosure. In this regard, each block in the flowcharts or block diagrams may represent a module, a program segment or a part of code, and the module, the program segment or the part of code includes one or more executable instructions for implementing specified logic functions. It should also be noted that in some alternative implementations, the functions marked in the blocks may alternatively occur in a different order from that marked in the drawings. For example, two successively shown blocks actually may be executed in parallel substantially, or may be executed in reverse order sometimes, depending on the functions involved. It should also be noted that each block in the flowcharts and/or block diagrams and combinations of the blocks in the flowcharts and/or block diagrams may be implemented by a dedicated hardware-based system for executing specified functions or operations, or may be implemented by a combination of dedicated hardware and computer instructions.

Related units described in the embodiments of the present disclosure may be implemented by software, or may be implemented by hardware. The name of a unit does not constitute a limitation on the unit itself.

The functions described above herein may be performed at least in part by one or more hardware logic components. For example, exemplary types of hardware logic components that can be used without limitations include a field programmable gate array (FPGA), an application specific integrated circuit (ASIC), an application specific standard product (ASSP), a system on chip (SOC), a complex programmable logic device (CPLD), and the like.

According to one or more embodiments of the present disclosure, a convolution operation method includes: determining an operation convolution kernel, wherein the operation convolution kernel is obtained based on an initial convolution kernel; the initial convolution kernel is expressed as [R, S, C, K]; the operation convolution kernel is expressed as [1, 1, (C×R×S), K]; and R, S, C, and K are all integers greater than 0; adjusting a layout of input data based on a number of channels of the operation convolution kernel to obtain target data, wherein a size and a number of channels of the target data are different from a size and a number of channels of the input data, and the number of channels of the target data is equal to the number of channels of the operation convolution kernel; and performing a convolution operation based on the target data and the operation convolution kernel to obtain a convolution operation result, wherein the convolution operation result of the target data and the operation convolution kernel is equal to a convolution operation result of the input data and the initial convolution kernel.

According to one or more embodiments of the present disclosure, the number of channels of the target data is greater than the number of channels of the input data and the number of channels of the operation convolution kernel is greater than the number of channels of the initial convolution kernel.

According to one or more embodiments of the present disclosure, adjusting the layout of the input data based on the number of channels of the operation convolution kernel to obtain the target data includes: storing the input data in a static memory in units of a row, wherein each row of the input data is stored in corresponding N entries in the static memory, N being an integer greater than 0; performing padding on the input data stored in the static memory to obtain extended data; and adjusting a layout of the extended data to change a size and a number of channels of the extended data so as to obtain the target data.

According to one or more embodiments of the present disclosure, storing the input data in the static memory in units of the row includes: storing the input data in a memory in a dense layout, wherein the input data includes a plurality of channels, and the dense layout refers to a plurality of channels of a same data point being stored in the memory in a sequential and contiguous manner; and transmitting the input data in the memory to the static memory of a hardware accelerator in a direct memory access manner, and storing first data points of the rows of the input data in first columns of different rows of the static memory such that each row of the input data is stored in the corresponding N entries in the static memory.

According to one or more embodiments of the present disclosure, performing the padding on the input data stored in the static memory to obtain the extended data includes: in the static memory, padding entries in front of and after a storage location corresponding to the input data with a first preset value to obtain first intermediate data, wherein the first intermediate data includes the input data and the padded first preset value; transmitting the first intermediate data to a vector calculation unit, and padding two ends of each row corresponding to the first intermediate data with a second preset value using a shift instruction and a padding instruction from the vector calculation unit to obtain second intermediate data, wherein the second intermediate data includes the first intermediate data and the padded second preset value; and transmitting the second intermediate data to a corresponding storage location in the static memory to obtain the extended data, wherein the extended data is the same as the second intermediate data in content.

According to one or more embodiments of the present disclosure, the target data is expressed as [1, ht, wt, (C×R×S)], ht and wt both being integers greater than 0; and adjusting the layout of the extended data to change the size and the number of channels of the extended data so as to obtain the target data includes: successively reading and transmitting data in R*N entries in the static memory to the vector calculation unit, wherein a start address of each read is shifted by str*N entries according to a preset stride str; the preset stride is a stride of a feature window required to perform a convolution operation on the input data and the initial convolution kernel in a row direction and a column direction; and a total number of reads of data from the static memory is equal to ht; and converting, by the vector calculation unit, the data in R*N entries received each time to data of wt*ceil((C×R×S)/L) entries to obtain the target data, wherein L represents a number of data points storable by each entry in the static memory; ceil((C×R×S)/L) represents rounding up (C×R×S)/L to an integer, and the converted data is the target data.

According to one or more embodiments of the present disclosure, converting, by the vector calculation unit, the data in R*N entries received each time to the data of wt*ceil((C×R×S)/L) entries to obtain the target data includes: dividing the data in R*N entries into a plurality of sets of data according to the preset stride, wherein each set of data corresponds to one feature window in the row direction, and a number of the plurality of sets of data is equal to wt; for each set of data, determining an initial location information parameter and a target location information parameter of each row of data of the feature window corresponding to the set of data; and storing, by the vector calculation unit based on the initial location information parameter and the target location information parameter, each set of data in a corresponding location of a target memory in a converted layout to obtain the target data, wherein the target memory allows for storage in units of the row, and the data transmitted to the target memory and stored on the target memory is the target data.

According to one or more embodiments of the present disclosure, the initial location information parameter includes a first start boundary coordinate, a first end boundary coordinate, a first start address, a first end address, a first start serial number, and a first end serial number; the first start boundary coordinate represents a relative coordinate of a start boundary of the corresponding feature window in the row direction of the extended data; the first end boundary coordinate represents a relative coordinate of an end boundary of the corresponding feature window in the row direction of the extended data; the start boundary of the corresponding feature window and the end boundary of the corresponding feature window are located at different locations in the row direction of the extended data; the first start address represents an address of the first start boundary coordinate in a memory of the vector calculation unit, and the first end address represents an address of the first end boundary coordinate in the memory of the vector calculation unit; the first start serial number represents a serial number of a data point corresponding to the first start boundary coordinate at the first start address, and the first end serial number represents a serial number of a data point corresponding to the first end boundary coordinate at the first end address.

According to one or more embodiments of the present disclosure, a calculation formula for the first start boundary coordinate is src_row_start_index=i*str*ch, wherein src_row_start_index represents the first start boundary coordinate; i represents a serial number of a corresponding data point of the corresponding feature window in the size wt of the target data; str represents a stride of the feature window in the row direction; and ch represents the number of channels of the input data; a calculation formula for the first end boundary coordinate is src_row_end_index=src_row_start_index+(kernel_w*ch−1), wherein src_row_end_index represents the first end boundary coordinate; kernel_w represents a width of the feature window; and a size of the feature window is equal to the size of the initial convolution kernel; a calculation formula for the first start address is src_row_start_address=src_row_start_index/vmem_lane+j*N, wherein src_row_start_address represents the first start address; vmem_lane represents a number of data points storable by each entry in the memory of the vector calculation unit; and j represents a row serial number of the corresponding data in the feature window; a calculation formula for the first end address is src_row_end_address=src_row_end_index/vmem_lane+j*N, wherein src_row_end_address represents the first end address; a calculation formula for the first start serial number is src_row_start_lane=src_row_start_index % vmem_lane, wherein src_row_start_lane represents the first start serial number; and % represents a modulo operation; and a calculation formula for the first end serial number is src_row_end_lane=src_row_end_index % vmem_lane, wherein src_row_end_lane represents the first end serial number.

According to one or more embodiments of the present disclosure, the target location information parameter includes a second start boundary coordinate, a second end boundary coordinate, a second start address, a second end address, a second start serial number, and a second end serial number; the second start boundary coordinate represents a relative coordinate of the start boundary of the corresponding feature window in a data size of [1, 1, (C×R×S)]; the second end boundary coordinate represents a relative coordinate of the end boundary of the corresponding feature window in the data size of [1, 1, (C×R×S)]; the start boundary of the corresponding feature window and the end boundary of the corresponding feature window are located at different locations in the row direction of the extended data; the second start address represents an address of the second start boundary coordinate in the memory of the vector calculation unit, and the second end address represents an address of the second end boundary coordinate in the memory of the vector calculation unit; the second start serial number represents a serial number of a data point corresponding to the second start boundary coordinate at the second start address, and the second end serial number represents a serial number of a data point corresponding to the second end boundary coordinate at the second end address.

According to one or more embodiments of the present disclosure, a calculation formula for the first start boundary coordinate is src_row_start_index=i*str*ch, wherein dst_row_start_index represents the second start boundary coordinate; j represents a row serial number of the corresponding data in the feature window; kernel_w represents the width of the feature window; the size of the feature window is equal to the size of the initial convolution kernel; and ch represents the number of channels of the input data; a calculation formula for the first end boundary coordinate is dst_row_end_index=dst_row_start_index+(kernel_w*ch−1), wherein dst_row_end_index represents the second end boundary coordinate; a calculation formula for the first start address is dst_row_start_address=dst_row_start_index/vmem_lane, wherein dst_row_start_address represents the second start address; and vmem_lane represents the number of data points storable by each entry in the memory of the vector calculation unit; a calculation formula for the first end address is dst_row_end_address=dst_row_end_index/vmem_lane, wherein dst_row_end_address represents the second end address; a calculation formula for the first start serial number is dst_row_start_lane=dst_row_start_index % vmem_lane, wherein dst_row_start_lane represents the second start serial number; and % represents the modulo operation; and a calculation formula for the first end serial number is dst_row_end_lane=dst_row_end_index % vmem_lane, wherein dst_row_end_lane represents the second end serial number.

According to one or more embodiments of the present disclosure, storing, by the vector calculation unit based on the initial location information parameter and the target location information parameter, each set of data in the corresponding location of the target memory in the converted layout to obtain the target data includes: based on the initial location information parameter and the target location information parameter, splicing, by the vector calculation unit using a cyclic shift instruction and according to a preset enable signal in a vector predicate register, each set of data in the converted layout and storing the data in the corresponding location of the target memory to obtain the target data.

According to one or more embodiments of the present disclosure, performing the convolution operation based on the target data and the operation convolution kernel includes: performing the convolution operation on the target data and the operation convolution kernel using a matrix operation unit.

According to one or more embodiments of the present disclosure, the convolution operation method is applied to a first-layer convolution operation of a convolutional neural network.

According to one or more embodiments of the present disclosure, a convolution operation apparatus includes: a determination unit configured to determine an operation convolution kernel, wherein the operation convolution kernel is obtained based on an initial convolution kernel; the initial convolution kernel is expressed as [R, S, C, K]; the operation convolution kernel is expressed as [1, 1, (C×R×S), K]; and R, S, C, and K are all integers greater than 0; an adjustment unit configured to adjust a layout of input data based on a number of channels of the operation convolution kernel to obtain target data, wherein a size and a number of channels of the target data are different from a size and a number of channels of the input data, and the number of channels of the target data is equal to the number of channels of the operation convolution kernel; and a calculation unit configured to perform a convolution operation based on the target data and the operation convolution kernel to obtain a convolution operation result, wherein the convolution operation result of the target data and the operation convolution kernel is equal to a convolution operation result of the input data and the initial convolution kernel.

According to one or more embodiments of the present disclosure, the number of channels of the target data is greater than the number of channels of the input data and the number of channels of the operation convolution kernel is greater than the number of channels of the initial convolution kernel.

According to one or more embodiments of the present disclosure, the adjustment unit includes a first adjustment sub-unit, a second adjustment sub-unit, and a third adjustment sub-unit. The first adjustment sub-unit is configured to store the input data in a static memory in units of a row, wherein each row of the input data is stored in corresponding N entries in the static memory, N being an integer greater than 0. The second adjustment sub-unit is configured to perform padding on the input data stored in the static memory to obtain extended data. The third adjustment sub-unit is configured to adjust a layout of the extended data to change a size and a number of channels of the extended data so as to obtain the target data.

According to one or more embodiments of the present disclosure, the first adjustment sub-unit includes a first storage unit and a second storage unit. The first storage unit is configured to store the input data in a memory in a dense layout, wherein the input data includes a plurality of channels, and the dense layout refers to a plurality of channels of a same data point being stored in the memory in a sequential and contiguous manner. The second storage unit is configured to transmit the input data in the memory to the static memory of a hardware accelerator in a direct memory access manner, and store first data points of the rows of the input data in first columns of different rows of the static memory such that each row of the input data is stored in the corresponding N entries in the static memory.

According to one or more embodiments of the present disclosure, the second adjustment sub-unit includes a first padding unit, a second padding unit, and a third padding unit. The first padding unit is configured to, in the static memory, pad entries in front of and after a storage location corresponding to the input data with a first preset value to obtain first intermediate data, wherein the first intermediate data includes the input data and the padded first preset value. The second padding unit is configured to transmit the first intermediate data to a vector calculation unit, and pad two ends of each row corresponding to the first intermediate data with a second preset value using a shift instruction and a padding instruction from the vector calculation unit to obtain second intermediate data, wherein the second intermediate data includes the first intermediate data and the padded second preset value. The third padding unit is configured to transmit the second intermediate data to a corresponding storage location in the static memory to obtain the extended data, wherein the extended data is the same as the second intermediate data in content.

According to one or more embodiments of the present disclosure, the target data is expressed as [1, ht, wt, (C×R×S)], ht and wt both being integers greater than 0. The third adjustment sub-unit includes a first changing unit and a second changing unit. The first changing unit is configured to successively read and transmit data in R*N entries in the static memory to the vector calculation unit, wherein a start address of each read is shifted by str*N entries according to a preset stride str; the preset stride is a stride of a feature window required to perform a convolution operation on the input data and the initial convolution kernel in a row direction and a column direction; and a total number of reads of data from the static memory is equal to ht. The first changing unit is configured to convert, by the vector calculation unit, the data in R*N entries received each time to data of wt*ceil((C×R×S)/L) entries to obtain the target data, wherein L represents a number of data points storable by each entry in the static memory; ceil((C×R×S)/L) represents rounding up (C×R×S)/L to an integer, and the converted data is the target data.

According to one or more embodiments of the present disclosure, the second changing unit including a grouping unit, a parameter determination unit, and a vector calculation unit. The grouping unit is configured to divide the data in R*N entries into a plurality of sets of data according to the preset stride, wherein each set of data corresponds to one feature window in the row direction, and a number of the plurality of sets of data is equal to wt. The parameter determination unit is configured to, for each set of data, determine an initial location information parameter and a target location information parameter of each row of data of the feature window corresponding to the set of data. The vector calculation unit is configured to store, based on the initial location information parameter and the target location information parameter, each set of data in a corresponding location of a target memory in a converted layout to obtain the target data, wherein the target memory allows for storage in units of the row, and the data transmitted to the target memory and stored on the target memory is the target data.

According to one or more embodiments of the present disclosure, the initial location information parameter includes a first start boundary coordinate, a first end boundary coordinate, a first start address, a first end address, a first start serial number, and a first end serial number; the first start boundary coordinate represents a relative coordinate of a start boundary of the corresponding feature window in the row direction of the extended data; the first end boundary coordinate represents a relative coordinate of an end boundary of the corresponding feature window in the row direction of the extended data; the start boundary of the corresponding feature window and the end boundary of the corresponding feature window are located at different locations in the row direction of the extended data; the first start address represents an address of the first start boundary coordinate in a memory of the vector calculation unit, and the first end address represents an address of the first end boundary coordinate in the memory of the vector calculation unit; the first start serial number represents a serial number of a data point corresponding to the first start boundary coordinate at the first start address, and the first end serial number represents a serial number of a data point corresponding to the first end boundary coordinate at the first end address.

According to one or more embodiments of the present disclosure, a calculation formula for the first start boundary coordinate is src_row_start_index=i*str*ch, wherein src_row_start_index represents the first start boundary coordinate; i represents a serial number of a corresponding data point of the corresponding feature window in the size wt of the target data; str represents a stride of the feature window in the row direction; and ch represents the number of channels of the input data; a calculation formula for the first end boundary coordinate is src_row_end_index=src_row_start_index+(kernel_w*ch−1), wherein src_row_end_index represents the first end boundary coordinate; kernel_w represents a width of the feature window; and a size of the feature window is equal to the size of the initial convolution kernel; a calculation formula for the first start address is src_row_start_address=src_row_start_index/vmem_lane+j*N, wherein src_row_start_address represents the first start address; vmem_lane represents a number of data points storable by each entry in the memory of the vector calculation unit; and j represents a row serial number of the corresponding data in the feature window; a calculation formula for the first end address is src_row_end_address=src_row_end_index/vmem_lane+j*N, wherein src_row_end_address represents the first end address; a calculation formula for the first start serial number is src_row_start_lane=src_row_start_index % vmem_lane, wherein src_row_start_lane represents the first start serial number; and % represents a modulo operation; and a calculation formula for the first end serial number is src_row_end_lane=src_row_end_index % vmem_lane, wherein src_row_end_lane represents the first end serial number.

According to one or more embodiments of the present disclosure, the target location information parameter includes a second start boundary coordinate, a second end boundary coordinate, a second start address, a second end address, a second start serial number, and a second end serial number; the second start boundary coordinate represents a relative coordinate of the start boundary of the corresponding feature window in a data size of [1, 1, (C×R×S)]; the second end boundary coordinate represents a relative coordinate of the end boundary of the corresponding feature window in the data size of [1, 1, (C×R×S)]; the start boundary of the corresponding feature window and the end boundary of the corresponding feature window are located at different locations in the row direction of the extended data; the second start address represents an address of the second start boundary coordinate in the memory of the vector calculation unit, and the second end address represents an address of the second end boundary coordinate in the memory of the vector calculation unit; the second start serial number represents a serial number of a data point corresponding to the second start boundary coordinate at the second start address, and the second end serial number represents a serial number of a data point corresponding to the second end boundary coordinate at the second end address.

According to one or more embodiments of the present disclosure, a calculation formula for the first start boundary coordinate is src_row_start_index=i*str*ch, wherein dst_row_start_index represents the second start boundary coordinate; j represents a row serial number of the corresponding data in the feature window; kernel_w represents the width of the feature window; the size of the feature window is equal to the size of the initial convolution kernel; and ch represents the number of channels of the input data; a calculation formula for the first end boundary coordinate is dst_row_end_index=dst_row_start_index+(kernel_w*ch−1), wherein dst_row_end_index represents the second end boundary coordinate; a calculation formula for the first start address is dst_row_start_address=dst_row_start_index/vmem_lane, wherein dst_row_start_address represents the second start address; and vmem_lane represents the number of data points storable by each entry in the memory of the vector calculation unit; a calculation formula for the first end address is dst_row_end_address=dst_row_end_index/vmem_lane, wherein dst_row_end_address represents the second end address; a calculation formula for the first start serial number is dst_row_start_lane=dst_row_start_index % vmem_lane, wherein dst_row_start_lane represents the second start serial number; and % represents the modulo operation; and a calculation formula for the first end serial number is dst_row_end_lane=dst_row_end_index % vmem_lane, wherein dst_row_end_lane represents the second end serial number.

According to one or more embodiments of the present disclosure, the vector calculation unit is further configured to, based on the initial location information parameter and the target location information parameter, splice, using a cyclic shift instruction and according to a preset enable signal in a vector predicate register, each set of data in the converted layout and store the data in the corresponding location of the target memory to obtain the target data.

According to one or more embodiments of the present disclosure, the calculation unit includes a calculation sub-unit configured to perform the convolution operation on the target data and the operation convolution kernel using a matrix operation unit.

According to one or more embodiments of the present disclosure, the convolution operation apparatus is applied to a first-layer convolution operation of a convolutional neural network.

According to one or more embodiments of the present disclosure, an electronic device includes the convolution operation apparatus provided by any embodiment of the present disclosure.

According to one or more embodiments of the present disclosure, an electronic device includes: a process; and a memory including at least one computer program module, wherein the at least one computer program module is stored in the memory and configured to be executed by the processor, and the at least one computer program module is configured to implement the convolution operation method provided by any embodiment of the present disclosure.

According to one or more embodiments of the present disclosure, a storage medium is provided, which stores non-transitory computer-readable instructions which, when executed by a computer, cause the convolution operation method provided by any embodiment of the present disclosure to be implemented.

The above description merely pertains to preferred embodiments of the present disclosure and explanations of the applied technical principles. Those skilled in the art should understand that the scope of the disclosure involved in the present disclosure is not limited to technical solutions formed by specific combinations of the aforementioned technical features. Instead, it also covers other technical solutions formed by any combination of these technical features or their equivalent features without departing from the concept of the present disclosure. For example, technical solutions formed by mutual substitution of the aforementioned features with (but not limited to) technical features having similar functions that are disclosed in the present disclosure.

Furthermore, although operations have been depicted in a particular order in the drawings, this should not be understood as requiring that these operations be performed in the illustrated specific order or sequentially. In certain contexts, multitasking and parallel processing may be advantageous. Likewise, while numerous specific details have been included in the discussion above, these should not be construed as limiting the scope of the present disclosure. Features described in the context of separate embodiments can also be implemented in combination in a single embodiment. Conversely, various features described in the context of a single embodiment can also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are only provided as examples of implementing the claims.

Regarding the present disclosure, the following points need further clarification:

(1) The drawings of the embodiments of the present disclosure only involve the structures related to the embodiments of the present disclosure; other structures can refer to conventional designs.

(2) In the situations where there is no conflict, the embodiments of the present disclosure and the features thereof in the embodiments can be combined with each other to obtain new embodiments.

The above description is merely to provide embodiments of the present disclosure, but the protection scope of the present disclosure is not limited thereto, and the protection scope of the present disclosure should be subject to the protection scope of the claims.

The invention claimed is:

1. A convolution operation method, comprising:
determining an operation convolution kernel, wherein the operation convolution kernel is obtained based on an initial convolution kernel, the initial convolution kernel is expressed as [R, S, C, K], the operation convolution kernel is expressed as [1, 1, (C×R×S), K], and R, S, C, and K are integers greater than 0;
adjusting a layout of input data based on a number of channels of the operation convolution kernel to obtain target data, wherein a size and a number of channels of the target data are different from a size and a number of channels of the input data, and the number of channels of the target data is equal to the number of channels of the operation convolution kernel; and
performing a convolution operation based on the target data and the operation convolution kernel to obtain a convolution operation result, wherein the convolution operation result of the target data and the operation convolution kernel is equal to a convolution operation result of the input data and the initial convolution kernel,
wherein the adjusting the layout of the input data based on the number of channels of the operation convolution kernel to obtain the target data comprises:
storing the input data in a static memory in units of rows, wherein each row of the input data is stored in corresponding N entries in the static memory, N being an integer greater than 0,
performing padding on the input data stored in the static memory to obtain extended data, wherein the performing padding on the input data stored in the static memory comprises:
in the static memory, padding entries in front of and after a storage location corresponding to the input data with a first preset value to obtain first intermediate data, wherein the first intermediate data comprise the input data and the padded first preset value,
transmitting the first intermediate data to a vector calculation circuit that comprises a memory, and padding two ends of each row corresponding to the first intermediate data with a second preset value using a shift instruction and a padding instruction from the vector calculation circuit to obtain second intermediate data, wherein the second intermediate data comprise the first intermediate data and the padded second preset value, and
transmitting the second intermediate data to a corresponding storage location in the static memory to obtain the extended data, wherein the extended data is the same as the second intermediate data in content.

2. The convolution operation method according to claim 1, wherein the number of channels of the target data is greater than the number of channels of the input data and the number of channels of the operation convolution kernel is greater than a number of channels of the initial convolution kernel.

3. The convolution operation method according to claim 1, further comprising:
adjusting a layout of the extended data to change a size and a number of channels of the extended data so as to obtain the target data.

4. The convolution operation method according to claim 1, wherein the storing the input data in a static memory in units of rows comprises:
storing the input data in a dense layout, wherein the input data comprises a plurality of channels, and the dense layout refers to a plurality of channels of a same data point being stored in a sequential and contiguous manner; and
transmitting the input data stored in the dense layout to the static memory of a hardware accelerator in a direct memory access manner, and storing first data points of rows of the input data in first columns of different rows of the static memory such that each row of the input data is stored in the corresponding N entries in the static memory.

5. The convolution operation method according to claim 3, wherein the target data is expressed as [1, ht, wt, (C×R×S)], ht and wt both being integers greater than 0; and
adjusting the layout of the extended data to change the size and the number of channels of the extended data so as to obtain the target data comprises:
successively reading and transmitting data in R*N entries in the static memory to the vector calculation circuit, wherein a start address of each read is shifted by str*N entries according to a preset stride str; the preset stride is a stride of a feature window required to perform a convolution operation on the input data and the initial convolution kernel in a row direction and a column direction; and a total number of reads of data from the static memory is equal to ht; and converting, by the vector calculation circuit, the data in R*N entries received each time to data of wt*ceil((C×R×S)/L) entries to obtain the target data, wherein L represents a number of data points storable by each entry in the static memory, ceil((C×R×S)/L) represents rounding up (C×R×S)/L to an integer, and the converted data is the target data.

6. The convolution operation method according to claim 5, wherein converting, by the vector calculation circuit, the data in R*N entries received each time to the data of wt*ceil((C×R×S)/L) entries to obtain the target data comprises:
dividing the data in R*N entries into a plurality of sets of data according to the preset stride, wherein each set of data corresponds to one feature window in the row direction, and a number of the plurality of sets of data is equal to wt;
for each set of data, determining an initial location information parameter and a target location information parameter of each row of data of the feature window corresponding to the set of data; and
storing, by the vector calculation circuit, based on the initial location information parameter and the target location information parameter, each set of data in a corresponding location of a target memory in a converted layout to obtain the target data, wherein the target memory allows for storage in units of the rows, and the data transmitted to the target memory and stored on the target memory is the target data.

7. The convolution operation method according to claim 6, wherein the initial location information parameter comprises a first start boundary coordinate, a first end boundary coordinate, a first start address, a first end address, a first start serial number, and a first end serial number;
the first start boundary coordinate represents a relative coordinate of a start boundary of a corresponding feature window in the row direction of the extended data; the first end boundary coordinate represents a relative coordinate of an end boundary of the corresponding feature window in the row direction of the extended data; the start boundary of the corresponding feature window and the end boundary of the corresponding feature window are located at different locations in the row direction of the extended data;
the first start address represents an address of the first start boundary coordinate in the memory of the vector calculation circuit, and the first end address represents an address of the first end boundary coordinate in the memory of the vector calculation circuit; and
the first start serial number represents a serial number of a data point corresponding to the first start boundary coordinate at the first start address, and the first end serial number represents a serial number of a data point corresponding to the first end boundary coordinate at the first end address.

8. The convolution operation method according to claim 7, wherein
a calculation formula for the first start boundary coordinate is src_row_start_index=i* str*ch, wherein src_row_start_index represents the first start boundary coordinate; i represents a serial number of a corresponding data point of the corresponding feature window in the wt dimension of the target data; str represents a stride of the feature window in the row direction; and ch represents the number of channels of the input data;

a calculation formula for the first end boundary coordinate is src_row_end_index=src_row_start_index+ (kernel_w*ch−1), wherein src_row_end_index represents the first end boundary coordinate; kernel_w represents a width of the feature window, and a size of the feature window is equal to a size of the initial convolution kernel;
a calculation formula for the first start address is: src_row_start_address=src_row_start_index/vmem_lane+j*N, wherein src_row_start_address represents the first start address, vmem_lane represents a number of data points storable by each entry in the memory of the vector calculation circuit, and j represents a row serial number of corresponding data in the feature window;
a calculation formula for the first end address is: src_row_end_address=src_row_end_index/vmem_lane+j*N, wherein src_row_end_address represents the first end address;
a calculation formula for the first start serial number is: src_row_start_lane=src_row_start_index % vmem_lane, wherein src_row_start_lane represents the first start serial number, and % represents a modulo operation; and
a calculation formula for the first end serial number is: src_row_end_lane=src_row_end_index % vmem_lane, wherein src_row_end_lane represents the first end serial number.

9. The convolution operation method according to claim 6, wherein the target location information parameter comprises a second start boundary coordinate, a second end boundary coordinate, a second start address, a second end address, a second start serial number, and a second end serial number;
the second start boundary coordinate represents a relative coordinate of a start boundary of a corresponding feature window in a data size of [1, 1, (C×R×S)]; the second end boundary coordinate represents a relative coordinate of an end boundary of the corresponding feature window in the data size of [1, 1, (C×R×S)]; the start boundary of the corresponding feature window and the end boundary of the corresponding feature window are located at different locations in the row direction of the extended data;
the second start address represents an address of the second start boundary coordinate in the memory of the vector calculation circuit, and the second end address represents an address of the second end boundary coordinate in the memory of the vector calculation circuit; and
the second start serial number represents a serial number of a data point corresponding to the second start boundary coordinate at the second start address, and the second end serial number represents a serial number of a data point corresponding to the second end boundary coordinate at the second end address.

10. The convolution operation method according to claim 9, wherein
a calculation formula for the second start boundary coordinate is: dst_row_start_index=j *kernel_w*ch, wherein dst_row_start_index represents the second start boundary coordinate, j represents a row serial number of corresponding data in the feature window, kernel_w represents a width of the feature window, and ch represents the number of channels of the input data; a size of the feature window is equal to a size of the initial convolution kernel;

a calculation formula for the second end boundary coordinate is: dst_row_end_index=dst_row_start_index+ (kernel_w*ch−1), wherein dst_row_end_index represents the second end boundary coordinate;

a calculation formula for the second start address is: dst_row_start_address=dst_row_start_index/vmem_lane, wherein dst_row_start_address represents the second start address, and vmem_lane represents a number of data points storable by each entry in the memory of the vector calculation circuit;

a calculation formula for the second end address is: dst_row_end_address=dst_row_end_index/vmem_lane, wherein dst_row_end_address represents the second end address;

a calculation formula for the second start serial number is: dst_row_start_lane=dst_row_start_index % vmem_lane, wherein dst_row_start_lane represents the second start serial number, and % represents a modulo operation; and a calculation formula for the second end serial number is: dst_row_end_lane=dst_row_end_index % vmem_lane, wherein dst_row_end_lane represents the second end serial number.

11. The convolution operation method according to claim 6, wherein storing, by the vector calculation circuit, based on the initial location information parameter and the target location information parameter, each set of data in the corresponding location of the target memory in the converted layout to obtain the target data comprises:

based on the initial location information parameter and the target location information parameter, splicing, by the vector calculation circuit using a cyclic shift instruction and according to a preset enable signal in a vector predicate register, each set of data in the converted layout and storing each set of data in the corresponding location of the target memory to obtain the target data.

12. The convolution operation method according to claim 1, wherein the convolution operation method is applied to a first-layer convolution operation of a convolutional neural network.

13. An electronic device, comprising:
a processor; and
a memory comprising at least one computer program module,
wherein the at least one computer program module is stored in the memory, when executed by the processor, the at least one computer program module cause the processor to:
determine an operation convolution kernel, wherein the operation convolution kernel is obtained based on an initial convolution kernel, the initial convolution kernel is expressed as [R, S, C, K], the operation convolution kernel is expressed as [1, 1, (C×R×S), K], and R, S, C, and K are integers greater than 0;
adjust a layout of input data based on a number of channels of the operation convolution kernel to obtain target data, wherein a size and a number of channels of the target data are different from a size and a number of channels of the input data, and the number of channels of the target data is equal to the number of channels of the operation convolution kernel; and
perform a convolution operation based on the target data and the operation convolution kernel to obtain a convolution operation result, wherein the convolution operation result of the target data and the operation convolution kernel is equal to a convolution operation result of the input data and the initial convolution kernel, wherein adjusting the layout of the input data based on the number of channels of the operation convolution kernel to obtain the target data comprises:

storing the input data in a static memory in units of rows, wherein each row of the input data is stored in corresponding N entries in the static memory, N being an integer greater than 0, performing padding on the input data stored in the static memory to obtain extended data, wherein the performing padding on the input data stored in the static memory comprises:

in the static memory, padding entries in front of and after a storage location corresponding to the input data with a first preset value to obtain first intermediate data, wherein the first intermediate data comprise the input data and the padded first preset value, transmitting the first intermediate data to a vector calculation circuit that comprises a first memory, and padding two ends of each row corresponding to the first intermediate data with a second preset value using a shift instruction and a padding instruction from the vector calculation circuit to obtain second intermediate data, wherein the second intermediate data comprise the first intermediate data and the padded second preset value, and transmitting the second intermediate data to a corresponding storage location in the static memory to obtain the extended data, wherein the extended data is the same as the second intermediate data in content.

14. The electronic device according to claim 13, wherein the number of channels of the target data is greater than the number of channels of the input data and the number of channels of the operation convolution kernel is greater than a number of channels of the initial convolution kernel.

15. The electronic device according to claim 13, wherein the processor is further caused to:
adjust a layout of the extended data to change a size and a number of channels of the extended data so as to obtain the target data.

16. The electronic device according to claim 15, wherein the processor is further caused to:
store the input data in a dense layout, wherein the input data comprises a plurality of channels, and the dense layout refers to a plurality of channels of a same data point being stored in a sequential and contiguous manner; and
transmit the input data stored in the dense layout to the static memory of a hardware accelerator in a direct memory access manner, and storing first data points of rows of the input data in first columns of different rows of the static memory such that each row of the input data is stored in the corresponding N entries in the static memory.

17. A non-transitory computer readable storage medium, storing computer-readable instructions which, when executed by a computer, cause the computer to:
determine an operation convolution kernel, wherein the operation convolution kernel is obtained based on an initial convolution kernel, the initial convolution kernel is expressed as [R, S, C, K], the operation convolution kernel is expressed as [1, 1, (C×R×S), K], and R, S, C, and K are integers greater than 0;
adjust a layout of input data based on a number of channels of the operation convolution kernel to obtain target data, wherein a size and a number of channels of the target data are different from a size and a number of channels of the input data, and the number of channels of the target data is equal to the number of channels of the operation convolution kernel; and perform a convolution operation based on the target data and the operation convolution kernel to obtain a convolution operation result, wherein the convolution operation result of the target data and the operation convolution kernel is equal to a convolution operation result of the input data and the initial convolution kernel, wherein adjusting the layout of the input data based on the number of channels of the operation convolution kernel to obtain the target data comprises:

storing the input data in a static memory in units of rows, wherein each row of the input data is stored in corresponding N entries in the static memory, N being an integer greater than 0, performing padding on the input data stored in the static memory to obtain extended data, wherein the performing padding on the input data stored in the static memory comprises:

in the static memory, padding entries in front of and after a storage location corresponding to the input data with a first preset value to obtain first intermediate data, wherein the first intermediate data comprise the input data and the padded first preset value, transmitting the first intermediate data to a vector calculation circuit that comprises a memory, and padding two ends of each row corresponding to the first intermediate data with a second preset value using a shift instruction and a padding instruction from the vector calculation circuit to obtain second intermediate data, wherein the second intermediate data comprise the first intermediate data and the padded second preset value, and transmitting the second intermediate data to a corresponding storage location in the static memory to obtain the extended data, wherein the extended data is the same as the second intermediate data in content.

18. The non-transitory computer readable storage medium according to claim 17, wherein the number of channels of the target data is greater than the number of channels of the input data and the number of channels of the operation convolution kernel is greater than a number of channels of the initial convolution kernel.

19. The non-transitory computer readable storage medium according to claim 17, wherein the computer-readable instructions which, when executed by the computer, cause the computer to:

adjust a layout of the extended data to change a size and a number of channels of the extended data to obtain the target data.

20. The non-transitory computer readable storage medium according to claim 17, wherein the storing the input data in the static memory in units of rows comprises:

storing the input data in a dense layout, wherein the input data comprises a plurality of channels, and the dense layout refers to a plurality of channels of a same data point being stored in a sequential and contiguous manner; and transmitting the input data stored in the dense layout to the static memory of a hardware accelerator in a direct memory access manner, and storing first data points of rows of the input data in first columns of different rows of the static memory such that each row of the input data is stored in the corresponding N entries in the static memory.

* * * * *